(12) United States Patent
Wojsznis et al.

(10) Patent No.: US 7,337,022 B2
(45) Date of Patent: Feb. 26, 2008

(54) CONSTRAINT AND LIMIT FEASIBILITY HANDLING IN A PROCESS CONTROL SYSTEM OPTIMIZER

(75) Inventors: Wilhelm Wojsznis, Austin, TX (US); Terrence Blevins, Round Rock, TX (US); Mark Nixon, Round Rock, TX (US); Peter Wojsznis, Cedar Park, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 430 days.

(21) Appl. No.: 10/465,153

(22) Filed: Jun. 19, 2003

(65) Prior Publication Data

US 2004/0049295 A1 Mar. 11, 2004

Related U.S. Application Data

(63) Continuation-in-part of application No. 10/241,350, filed on Sep. 11, 2002.

(51) Int. Cl.
*G05B 13/02* (2006.01)
(52) U.S. Cl. .............................. 700/36; 700/28; 700/29; 700/30; 700/31; 700/44; 700/53
(58) Field of Classification Search ............ 700/28–33, 700/36, 44, 53, 51
See application file for complete search history.

(56) References Cited

U.S. PATENT DOCUMENTS

| | | | |
|---|---|---|---|
| 3,828,171 A | 8/1974 | Griffin | 235/151.12 |
| 4,054,408 A | 10/1977 | Sheffield et al. | 431/12 |
| 4,349,869 A | 9/1982 | Prett et al. | 364/159 |
| 4,616,308 A | 10/1986 | Morshedi et al. | 364/159 |
| 4,641,235 A | 2/1987 | Shigemasa et al. | |
| 4,912,624 A | 3/1990 | Harth et al. | |
| 5,018,215 A | 5/1991 | Nasr et al. | |
| 5,159,547 A | 10/1992 | Chand | |
| 5,159,562 A | 10/1992 | Putman et al. | |
| 5,180,896 A | 1/1993 | Gibby et al. | |

(Continued)

FOREIGN PATENT DOCUMENTS

EP 0 588 594 3/1994

(Continued)

OTHER PUBLICATIONS

Examination Report under Section 18(3) issued in GB 0321291.7 application by the United Kingdom Patent Office on Jun. 30, 2005.

(Continued)

*Primary Examiner*—Ronald D Hartman, Jr.
(74) *Attorney, Agent, or Firm*—Marshall Gerstein & Borun LLP

(57) ABSTRACT

An optimization technique for use in driving a process plant controller, such as a model predictive controller, uses an organized, systematic but computationally simple method of relaxing or redefining manipulated, control and/or auxiliary variable constraints when there is no feasible optimal solution within pre-established constraints, to thereby develop an achievable solution for use by the controller. The optimization routine uses penalized slack variables and/or redefines the constraint model in conjunction with the use of penalty variables to develop a new objective function, and then uses the new objective function to determine a control solution that bests meets the original constraint limits.

53 Claims, 7 Drawing Sheets

U.S. PATENT DOCUMENTS

| | | | |
|---|---|---|---|
| 5,216,593 A | 6/1993 | Dietrich et al. | |
| 5,239,378 A * | 8/1993 | Tsuji et al. | 348/625 |
| 5,272,621 A | 12/1993 | Aoki et al. | |
| 5,301,101 A | 4/1994 | MacArthur et al. | |
| 5,329,443 A | 7/1994 | Bonaquist et al. | |
| 5,335,164 A | 8/1994 | Gough, Jr. et al. | |
| 5,351,184 A | 9/1994 | Lu et al. | 364/165 |
| 5,384,698 A | 1/1995 | Jelinek | |
| 5,453,925 A | 9/1995 | Wojsznis et al. | |
| 5,461,559 A | 10/1995 | Heyob et al. | |
| 5,521,814 A | 5/1996 | Teran et al. | |
| 5,561,599 A | 10/1996 | Lu | 364/164 |
| 5,568,378 A | 10/1996 | Wojsznis | |
| 5,572,420 A | 11/1996 | Lu | |
| 5,574,638 A | 11/1996 | Lu | |
| 5,587,899 A | 12/1996 | Ho et al. | |
| 5,625,552 A | 4/1997 | Mathur et al. | |
| 5,659,667 A | 8/1997 | Buescher et al. | |
| 5,680,304 A | 10/1997 | Wang et al. | |
| 5,682,309 A | 10/1997 | Bartusiak et al. | |
| 5,696,696 A | 12/1997 | Gunther et al. | |
| 5,748,467 A | 5/1998 | Qin et al. | |
| 5,754,446 A * | 5/1998 | Fisher et al. | 700/287 |
| 5,758,047 A | 5/1998 | Lu et al. | |
| 5,886,895 A | 3/1999 | Kita et al. | |
| 5,920,478 A | 7/1999 | Ekblad et al. | |
| 5,930,762 A * | 7/1999 | Masch | 705/7 |
| 5,933,345 A | 8/1999 | Martin et al. | 364/164 |
| 6,041,320 A | 3/2000 | Qin et al. | |
| 6,047,221 A | 4/2000 | Piche et al. | 700/44 |
| 6,049,738 A | 4/2000 | Kayama et al. | |
| 6,055,483 A | 4/2000 | Lu | |
| 6,122,555 A | 9/2000 | Lu | |
| 6,249,712 B1 | 6/2001 | Boiquaye | |
| 6,278,899 B1 | 8/2001 | Piche et al. | 700/44 |
| 6,319,362 B1 | 11/2001 | Huhtelin et al. | |
| 6,328,851 B1 | 12/2001 | Huhtelin et al. | |
| 6,330,483 B1 | 12/2001 | Dailey | |
| 6,336,050 B1 | 1/2002 | Amin et al. | |
| 6,377,908 B1 * | 4/2002 | Ostrowski et al. | 703/2 |
| 6,381,505 B1 * | 4/2002 | Kassmann et al. | 700/44 |
| 6,438,430 B1 * | 8/2002 | Martin et al. | 700/28 |
| 6,445,963 B1 | 9/2002 | Blevins et al. | 700/44 |
| 6,487,459 B1 | 11/2002 | Martin et al. | 700/44 |
| 6,542,782 B1 | 4/2003 | Lu | |
| 6,577,916 B1 | 6/2003 | Gehr et al. | |
| 6,587,738 B1 * | 7/2003 | Belcea | 700/33 |
| 6,615,090 B1 | 9/2003 | Blevins et al. | |
| 6,625,501 B2 * | 9/2003 | Martin et al. | 700/44 |
| 6,678,668 B2 | 1/2004 | Fisher et al. | |
| 6,681,155 B1 | 1/2004 | Fujita et al. | |
| 6,701,223 B1 | 3/2004 | Rachford, Jr. et al. | |
| 6,721,609 B1 | 4/2004 | Wojsznis et al. | |
| 6,772,019 B2 | 8/2004 | Karas | |
| 6,954,713 B2 | 10/2005 | Eryurek | |
| 6,993,396 B1 | 1/2006 | Gerry | |
| 2001/0021900 A1 * | 9/2001 | Kassmann | 703/2 |
| 2002/0103548 A1 | 8/2002 | Treiber et al. | |
| 2003/0120361 A1 * | 6/2003 | Anderson et al. | 700/31 |
| 2003/0125818 A1 * | 7/2003 | Johnson | 700/28 |
| 2004/0049299 A1 | 3/2004 | Wojsznis et al. | |
| 2004/0117766 A1 | 6/2004 | Mehta et al. | |

FOREIGN PATENT DOCUMENTS

| | | |
|---|---|---|
| EP | 0591273 A1 | 3/1994 |
| EP | 0 591 273 A1 | 4/1994 |
| GB | 2 355 545 | 4/2001 |
| GB | 2 394 312 | 4/2004 |
| GB | 2 394 313 | 4/2004 |
| WO | WO 92/19156 | 11/1992 |
| WO | WO92/19156 | 11/1992 |
| WO | WO-97/12300 | 4/1997 |
| WO | WO-00/33209 | 6/2000 |

OTHER PUBLICATIONS

Tyler, M.L. and Morari, M., "Propositional Logic in Control and Monitoring Problems," Proceedings of European Control Conference '97, pp. 623-628, Bruxelles, Belgium, Jun. 1997.

Vada, J., Slupphaug, O. and Foss, B.A., "Infeasibility Handling in Linear MPC subject to Prioritized Constraints," Preprints IFAC'99 14th World Congress, Beijing, China, Jul. 1999.

Vada, J., Slupphaug, O. and Johansen, T.A., "Efficient Infeasibility Handling in Linear MPC subject to Prioritized Constraints," European Control Conference, 1999.

Wojsznis, W., Blevins, T., Nixon, M., and Wojsznis, P., "Infeasibility Handling in MPC with Prioritized Constraints," ISA 2003, Houston, Texas, USA, Oct. 21, 2003.

Wojsznis, W., T., Thiele D., Wojsznis, P., and Ashish Mehta, "Integration of Real Time Process Optimizer with a Model Predictive Function Block," ISA Conference, Chicago, Oct. 2002.

William H. Press, Saul A. Teukolsky, William T. Vetterling, Brian P. Flannery, "Numerical Recepies in C," Cambridge University Press, pp. 430-443, 1997.

Examination Report in GB 0321249.5 dated Jul. 20, 2005.

Search Report in GB 0321249.5 dated Feb. 11, 2004.

Examination Report in GB 0321279.2 dated Jun. 30, 2005.

Search Report in GB 0321279.2 dated Feb. 17, 2004.

Examination Report in GB 0321279.2 dated Mar. 1, 2006.

Examination Report in GB 0321278.4 dated Jul. 19, 2005.

Search Report in GB 0321278.4 dated Feb. 16, 2004.

Hanagud et al., "Artificial Intelligence-Based Model-Adaptive Approach to Flexible Structure Control," American Institute of Aeronautics and Astronautics, Inc., vol. 13, pp. 534-544 (1990).

Misra, Jayadev Auxiliary Variables Notes on UNITY: 15-90, UT Austin (1990).

Combined Search and Examination Report under Sections 17 and 18(3) issued in GB 0600443.6 application by the United Kingdom Patent Office on Jun. 29, 2006.

Examination Report under Section 17(5) issued in GB 0321291.7 application by the United Kingdom Patent Office on Feb. 19, 2004.

Thiele et al., "Configuration and Viewing Display for an Integrated Model Predictive Control and Optimizer Function Block," U.S. Appl. No. 10/310,416, filed Dec. 5, 2002.

Qin, S.J. and Badgwell, T.A., "An Overview of Industrial Model Predictive Control Technology," Fifth International Conference on Chemical Process Control, pp. 232-256, AIChE and CACHE, 1997.

Jan M. Maciejowski, "Model Predictive Control with Constraints," Pearson Education Limited, Appendix A, Appendix B, 2002.

C. Rao, S. Wright, and J. Rawlings, "Application of Interior-Point Methods to Model Predictive Control," J. Optim. Theory Appl., 99:723-757, 1998.

Willy Wojsznis, Terrence Blevins and Mark Nixon, "Easy Robust Optimal Predictive Controller," Advances in Instrumentation and Control, ISA/2000 Conference, Aug. 2000, New Orleans.

W. Wojsznis, J. Gudaz, A. Mehta, and T. Blevins, "Practical Approach to Tuning MPC," in Proceedings of ISA 2001 Conference, Sep. 10-13, 2001, Houston, TX.

Thiele, D. and Ottenbacher, R., "Simulation of Multivariable Model Predictive Control," in Proceedings of ISA 2001 Conference, Sep. 10-13, 2001, Houston, TX.

"Delta V Predict and Delta V PredictPro - Powerful Practical Model Predictive Control," Product data sheet, Jun. 2003.

Dirk Thiele, "Benefits and challenges of implementing model predictive control as a function block," Advances in Instrumentation and Control, ISA/2000 Conference, Aug. 2000, New Orleans.

Garcia, C.E., and A.M. Morshedi, "Quadratic Programming Solution of Dynamic Matrix Control (QDMC)," Chemical Engineering Communications, 46:73-87, 1986.

C.R. Cutler, and B.L. Ramaker, "Dynamic Matrix Control - A Computer Control Algorithm," Proceedings of the Joint Automatic Control Conference, 1980.

Chmelyk, T.T., "An Integrated Approach to Model Predictive Control of an Industrial Lime Kiln, " NORPAC Controls Ltd.

MDC Technology, "RTO Technical Presentation, ".

Dynamic Matrix Control Corporation, "DMC Multivariable Model Predictive Constraint Control, ".

Garcia, C.E., Prett, D.M., and Morari, M., "Model Predictive Control: Theory and Practice - a Survey," Automatica, vol. 25, No. 3, pp. 335-348, 1989.

Froisy, J.B., "Model predictive control: Past, present and future," ISA Transactions 33:235-243, 1994.

Lee, J.H., Morari, M., and Garcia, C.E., "State-space Interpretation of Model Predictive Control, "Automatica, vol. 30, No. 4, pp. 707-717, 1994.

Rawlings, J.B., Muske, K.R., "Model Predictive Control with Linear Models," Process Systems Engineering, vol. 39, No. 2, Feb. 1993.

Wojsznis, W.K., Wojsznis, P.W., "Robust Predictive Controller in Object-Oriented Implementation," ISA, Paper No. 93-297, pp. 521-528, 1993.

Lee, J.H., Yu, Z.H., "Tuning of Model Predictive Controllers for Robust Performance," Computers in Chemical Engineering, vol. 18, No. 1, pp. 15-37, 1994.

MacArthur, J.W., "RMPCT: A New Robust Approach to Multivariable Predictive Control for the Process Industries," Proceedings of the 1996 Control Systems Conference, Halifax, Canada, 1996.

Shridhar, R., Cooper, D.J., "A Novel Tuning Strategy for Multivariable Model Predictive Control," ISA Transactions, vol. 36, No. 4, pp. 273-280, 1998.

Babb, Michael, "Fast Computers Open the Way for Advanced Controls," Control Engineering, Jan. 1991.

McDonnell; M., Abu el Ata-Doss, S., "Predictive Functional Controlof Multivariable Systems with more Outputs than Inputs," Proceedings 28 CDC, Orlando, Florida, 1989.

Morari, M., Ricker, N.L., and Zafiriou, E., "Model Predictive Control Toolbox," Matlab ®User's Guide, Version 1, The Math Works, Inc. 1995.

De Keyser, R.M.C., Van de Velde, Ph.G.A., and Dumortier F.A.G., "A Comparative Study of Self-Adaptive Long-Range Predictive Control Methods," Automatica, vol. 24, No. 2, pp. 149-163, 1988.

Rumbaugh, J., "Let There Be Objects: A Short Guide to Reification," Journal of Object-Oriented Programming, vol. 5, No. 7, Nov./Dec. 1992.

Lynch, P.A., De Paso, J., "An Object Oriented Intelligent Control Architecture," 1992 ACC/TP4, vol. 3, 92CH3072-6, Chicago.

U.S. Appl. No. 10/241,350 entitled "Intergrated Model Predictive Control and Optimization Within a Process Control System," which was filed on Sep. 11, 2002.

* cited by examiner

CONSTRAINT AND LIMIT FEASIBILITY HANDLING IN A PROCESS CONTROL SYSTEM OPTIMIZER

RELATED APPLICATION

This application is a continuation-in-part of U.S. patent application Ser. No. 10/241,350, entitled "Integrated Model Predictive Control and Optimization Within a Process Control System," which was filed on Sep. 11, 2002, the disclosure of which is expressly incorporated by reference herein.

FIELD OF TECHNOLOGY

This patent relates generally to process control systems and, more particularly, to constraint and limit feasibility handling in a process control system optimizer when used with, for example, a model predictive controller to control a process plant.

DESCRIPTION OF THE RELATED ART

Process control systems, such as distributed or scalable process control systems like those used in chemical, petroleum or other processes, typically include one or more process controllers communicatively coupled to each other, to at least one host or operator workstation and to one or more field devices via analog, digital or combined analog/digital buses. The field devices, which may be, for example valves, valve positioners, switches and transmitters (e.g., temperature, pressure and flow rate sensors), perform functions within the process such as opening or closing valves and measuring process parameters. The process controller receives signals indicative of process measurements made by the field devices and/or other information pertaining to the field devices, uses this information to implement a control routine and then generates control signals which are sent over the buses to the field devices to control the operation of the process. Information from the field devices and the controller is typically made available to one or more applications executed by the operator workstation to enable an operator to perform any desired function with respect to the process, such as viewing the current state of the process, modifying the operation of the process, etc.

Process controllers are typically programmed to execute different algorithms, sub-routines or control loops (which are all control routines) for each of a number of different loops defined for, or contained within a process, such as flow control loops, temperature control loops, pressure control loops, etc. Generally speaking, each such control loop includes one or more input blocks, such as an analog input (AI) function block, a single-output control block, such as a proportional-integral-derivative (PID) or a fuzzy logic control function block, and a single output block, such as an analog output (AO) function block. These control loops typically perform single-input/single-output control because the control block creates a single control output used to control a single process input, such as a valve position, etc. However, in certain cases, the use of a number of independently operating, single-input/single-output control loops is not very effective because the process variables being controlled are affected by more than a single process input and, in fact, each process input may affect the state of many process outputs. An example of this situation might occur in, for example, a process having a tank being filled by two input lines, and being emptied by a single output line, each line being controlled by a different valve, and in which the temperature, pressure and throughput of the tank are being controlled to be at or near desired values. As indicated above, the control of the throughput, the temperature and the pressure of the tank may be performed using a separate throughput control loop, a separate temperature control loop and a separate pressure control loop. However, in this situation, the operation of the temperature control loop in changing the setting of one of the input valves to control the temperature within the tank may cause the pressure within the tank to increase, which, for example, causes the pressure loop to open the outlet valve to decrease the pressure. This action may then cause the throughput control loop to close one of the input valves, thereby affecting the temperature and causing the temperature control loop to take some other action. As will be understood in this example, the single-input/single-output control loops cause the process outputs (in this case, throughput, temperature and pressure) to behave in an unacceptable manner wherein the outputs oscillate without ever reaching a steady state condition.

Model predictive control (MPC) or other types of advanced control have been used to perform process control in situations in which changes to a particular controlled process variable affects more than one process variable or output. Since the late 1970s, many successful implementations of model predictive control have been reported and MPC has become the primary form of advanced multivariable control in the process industry. Still further, MPC has been implemented within distributed control systems as distributed control system layered software.

Generally speaking, MPC is a multiple-input/multiple output control strategy in which the effects of changing each of a number of process inputs on each of a number of process outputs is measured and these measured responses are then used to create a control matrix or a model of the process. The process model or control matrix (which generally defines the steady state operation of the process) is inverted mathematically and is then used in or as a multiple-input/multiple-output controller to control the process outputs based on changes made to the process inputs. In some cases, the process model is represented as a process output response curve (typically a step response curve) for each of the process inputs and these curves may be created based on a series of, for example, pseudo-random step changes delivered to each of the process inputs. These response curves can be used to model the process in known manners. MPC is known in the art and, as a result, the specifics thereof will not be described herein. However, MPC is described generally in Qin, S. Joe and Thomas A. Badgwell, "An Overview of Industrial Model Predictive Control Technology," AIChE Conference, 1996. In addition, U.S. Pat. Nos. 4,616,308 and 4,349,869 generally describe MPC controllers that can be used within a process control system.

MPC has been found to be a very effective and useful control technique and has been used in conjunction with process optimization. To optimize a process which uses MPC, an optimizer minimizes or maximizes one or more process input variables determined by the MPC routine so as to cause the process to run at an optimal point. While this technique is computationally possible, it is necessary to select the process variables that have, for example, a significant impact on improving the economic operation of the process (e.g. process throughput or quality) to optimize the process from an economic standpoint. Operating the process at an optimal point from a financial or economic viewpoint typically, requires controlling many process variables in conjunction with one another, not just a single process variable.

Optimizing with the use of quadratic programming techniques or more current techniques like interior point methods has been proposed as a solution to providing dynamic optimization with MPC. With these methods, an optimization solution is determined and the optimizer provides the controller with moves in the controller outputs (i.e., the manipulated variables of the process), taking into account process dynamics, current constraints and optimization objectives. However, this approach has a tremendous computational burden and is not practically feasible at the current technology level.

In most cases when using MPC, the number of manipulated variables available within the process (i.e., the control outputs of the MPC routine) is greater than the number of control variables of the process (i.e., the number of process variables that must be controlled to be at a particular set point). As a result, there are usually more degrees of freedom that are available for optimization and constraint handling. Theoretically, to perform such optimization, values expressed by process variables, constraints, limits and economic factors defining an optimal operation point of the process should be calculated. In many cases, these process variables are constrained variables because they have limits related to physical properties of the process to which they pertain and within which these variables must be kept. For example, a process variable representing tank level is limited to the maximum and minimum levels physically achievable within the actual tank. An optimizing function may calculate the costs and/or profits associated with each of the constrained or auxiliary variables to operate at a level in which profit is maximized, costs are minimized, etc. Measurements of these auxiliary variables can then be provided as inputs to the MPC routine and treated by the MPC routine as control variables having a set point equal to the operational point for the auxiliary variable defined by the optimization routine.

U.S. patent application Ser. No. 10/241,350, entitled "Integrated Model Predictive Control and Optimization Within a Process Control System," which was filed on Sep. 11, 2002, which is assigned to the assignee hereof and the disclosure of which is hereby expressly incorporated by reference herein, discloses a method and apparatus for providing on-line optimization with an advanced control block, such as an MPC block in which optimization is an integral part of multivariable model predictive control. This technique is successful, in large part, because the MPC controller, in normal operation, provides a future prediction of the process outputs up to a steady state condition, thereby creating the required conditions for reliable optimizer operation. However, this optimization approach for finding a solution does not always work because, in some situations, some of the controller outputs or predicted controller outputs (referred to herein as manipulated variables) or some of the process outputs (referred to herein as controlled or control variables) associated with each of the possible optimized solutions are outside of predefined constraints or limits previously set for those variables and the solution is, therefore, in a previously defined infeasible range. It is desirable and, in many control situations, necessary that the optimizer, when integrated with the operation of the MPC or other controller always find a solution while avoiding operating, to the best extent possible, in an infeasible range.

Currently, when an optimizer determines that there is no feasible but optimal solution which keeps all of the process control outputs or inputs within previously established constraints or limits, the optimizer generally relaxes one or more constraints or limits in order to find an acceptable solution. This recovery technique typically uses priorities associated with each of the manipulated and control variables to determine which constraint limit to relax first. Here, a simple approach is to drop the lowest priority constraints in order to enable the optimizer to find a solution that meets the higher priority constraints. However, this technique is not necessarily the most rational way of dealing with constraints in infeasible solutions because dropping lower priority constraints may cause these constraints to go well out of limits simply to allow a minimal adjustment to one or more higher priority constraints. Still further, it is typically necessary to estimate how many constraints must be dropped to find a feasible solution. Of course, it is desirable to drop the minimal number of constraints necessary to enable the higher priority constraints to be met. To determine the appropriate number of constraints to drop, however, it may be necessary to perform off-line calculations based on available degrees of freedom within the system, or to cause the optimizer to iteratively drop a constraint and determine if a feasible solution exits with the new reduced set of constraints until a feasible solution is found. Unfortunately, off-line calculations do not work well in real-time or on-line optimization systems and the iterative approach is generally unbounded and, therefore may cause unacceptable delay in finding a feasible solution. In other words, the process of developing an optimal solution by sequentially dropping constraints may need to be repeated until a solution is found, and such an open-ended iterative process is not desirable in most real time optimization applications.

Several other known approaches to solving optimization in the presence of infeasible solutions have been proposed. For example, Tyler, M. L. and Morari M., "Propositional Logic in Control and Monitoring Problems," *Proceedings of European Control Conference* '97, pp. 623-628, Bruxelles, Belgium, June 1997, discloses using integer variables to cope with prioritization wherein the size of violation is minimized by solving a sequence of mixed integer optimization problems. Alternatively, Vada, J., Slupphaug, O. and Foss, B. A., "Infeasibility Handling in Linear MPC subject to Prioritized Constraints," *PreprintsIFAC'99 14$^{th}$ World Congress*, Beijing, China, July 1999, discusses an algorithm that may be used to solve a sequence of linear programming (LP) or quadratic programming (QP) problems to minimize the violations of the constraints which cannot be fulfilled. However, both of these approaches are computationally demanding and are not generally adequate or acceptable for fast, real time applications. Alternatively, Vada, J., Slupphaug, O. and Johansen, T. A., "Efficient Infeasibility Handling in Linear MPC subject to Prioritized Constraints," *ACC*2002 *Proceedings*, Anchorage, Ak., May 2002 discloses an off-line algorithm that calculates LP weights which optimize the computed constraint violations. While this technique takes the burden of excess computations to an off-line environment, it requires dealing with an additional off-line optimization problem and is not very useful for on-line or real time optimization procedures.

SUMMARY OF THE DISCLOSURE

An integrated optimization technique, that may be used to optimize an advanced control procedure such as a model predictive control procedure, uses an organized, systematic but computationally simple method of relaxing or redefining manipulated or control variable constraints or limits when there is no feasible optimal solution within the pre-established constraints or limits to thereby find an achievable optimal solution for use in the control procedure. In particular, the optimization routine uses robust and reliable techniques based on penalized slack variables and/or on redefining the constraint model to systematically choose the best solution when faced with an optimizer solution which is infeasible within pre-established constraint limits. Because the disclosed technique is computationally simple, this technique is suitable for on-line implementation of a real-time optimizer.

In one embodiment, the optimizer may use an objective function that includes penalized slack variables to find an optimal solution in the presence of one or more manipulated or control variables that will be driven out of pre-set limits. In another embodiment, the optimizer may redefine the constraint model to thereby redefine the acceptable limits for manipulated or control variables that are out of limits and then use an objective function with penalty variables defined in the new constraint model to drive the out of limit constraints with higher priorities toward pre-established limits with no further constraint violations for lower priority constraints. In still another embodiment, the optimizer may merge the use of penalized slack variables with constraint model redefinition to provide a flexible and efficient constraint handling technique.

DESCRIPTION

Figure 1:
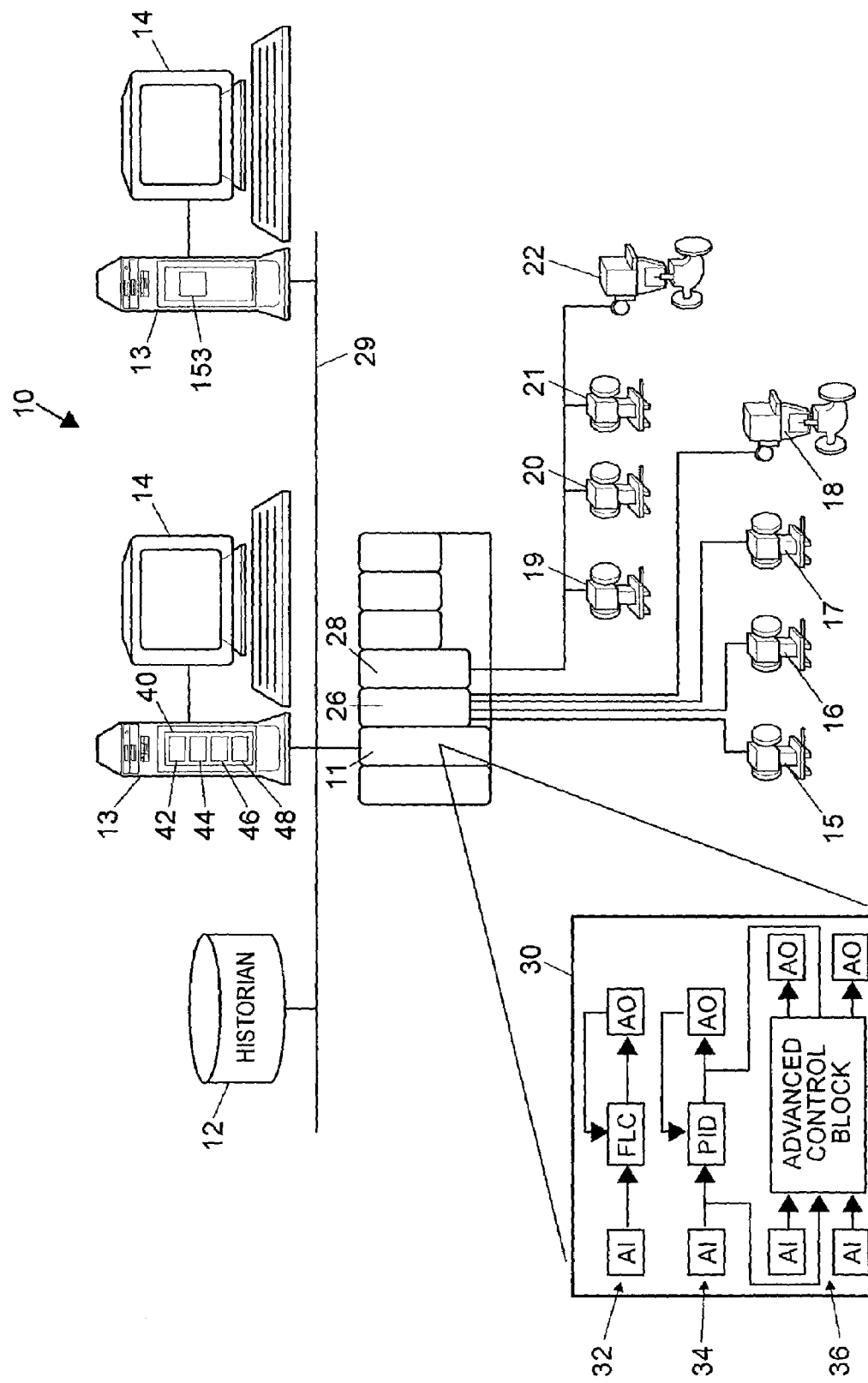
FIG. 1 is a block diagram of a process control system including a control module having an advanced controller function block that integrates an optimizer with an MPC controller.

Referring now to FIG. 1, a process control system 10 includes a process controller 11 communicatively connected to a data historian 12 and to one or more host workstations or computers 13 (which may be any type of personal computers, workstations, etc.), each having a display screen 14. The controller 11 is also connected to field devices 15-22 via input/output (I/O) cards 26 and 28. The data historian 12 may be any desired type of data collection unit having any desired type of memory and any desired or known software, hardware or firmware for storing data and may be separate from (as illustrated in FIG. 1) or a part of one of the workstations 13. The controller 11, which may be, by way of example, the DeltaV™ controller sold by Emerson Process Management is communicatively connected to the host computers 13 and the data historian 12 via, for example, an Ethernet connection or any other desired communication network 29. The communication network 29 may be in the form of a local area network (LAN), a wide area network (WAN), a telecommunications network, etc. and may be implemented using hardwired or wireless technology. The controller 11 is communicatively connected to the field devices 15-22 using any desired hardware and software associated with, for example, standard 4-20 ma devices and/or any smart communication protocol such as the FOUNDATION™ Fieldbus protocol (Fieldbus), the HART™ protocol, etc.

The field devices 15-22 may be any types of devices, such as sensors, valves, transmitters, positioners, etc. while the I/O cards 26 and 28 may be any types of I/O devices conforming to any desired communication or controller protocol. In the embodiment illustrated in FIG. 1, the field devices 15-18 are standard 4-20 ma devices that communicate over analog lines to the I/O card 26 while the field devices 19-22 are smart devices, such as Fieldbus field devices, that communicate over a digital bus to the I/O card 28 using Fieldbus protocol communications. Of course, the field devices 15-22 could conform to any other desired standard(s) or protocols, including any standards or protocols developed in the future.

The controller 11, which may be one of many distributed controllers within the plant 10 and which includes at least one processor therein, implements or oversees one or more process control routines, which may include control loops, stored therein or otherwise associated therewith. The controller 11 also communicates with the devices 15-22, the host computers 13 and the data historian 12 to control a process in any desired manner. It should be noted that any control routines or elements described herein may have parts thereof implemented or executed by different controllers or other devices if so desired. Likewise, the control routines or elements described herein to be implemented within the process control system 10 may take any form, including software, firmware, hardware, etc. For the purpose of this discussion, a process control element can be any part or portion of a process control system including, for example, a routine, a block or a module stored on any computer readable medium. Control routines, which may be modules or any part of a control procedure such as a subroutine, parts of a subroutine (such as lines of code), etc. may be implemented in any desired software format, such as using ladder logic, sequential function charts, function block diagrams, object oriented programming or any other software programming language or design paradigm. Likewise, the control routines may be hard-coded into, for example, one or more EPROMs, EEPROMs, application specific integrated circuits (ASICs), or any other hardware or firmware elements. Still further, the control routines may be designed using any design tools, including graphical design tools or any other type of software, hardware, or firmware programming or design tools. Thus, the controller 11 may be configured to implement a control strategy or control routine in any desired manner.

In one embodiment, the controller 11 implements a control strategy using what are commonly referred to as function blocks, wherein each function block is a part or object of an overall control routine and operates in conjunction with other function blocks (via communications called links) to implement process control loops within the process control system 10. Function blocks typically perform one of an input function, such as that associated with a transmitter, a sensor or other process parameter measurement device, a control function, such as that associated with a control routine that performs PID, fuzzy logic, etc. control, or an output function which controls the operation of some device, such as a valve, to perform some physical function within the process control system 10. Of course hybrid and other types of function blocks exist. Function blocks may be stored in and executed by the controller 11, which is typically the case when these function blocks are used for, or are associated with standard 4-20 ma devices and some types of smart field devices such as HART devices, or may be stored in and implemented by the field devices themselves, which may be the case with Fieldbus devices. While the description of the control system is provided herein using a function block control strategy which uses an object oriented programming paradigm, the control strategy or control loops or modules could also be implemented or designed using other conventions, such as ladder logic, sequential function charts, etc. or using any other desired programming language or paradigm.

As illustrated by the expanded block 30 of FIG. 1, the controller 11 may include a number of single-loop control routines, illustrated as routines 32 and 34, and may implement one or more advanced control loops, illustrated as control loop 36. Each such loop is typically referred to as a control module. The single-loop control routines 32 and 34 are illustrated as performing single loop control using a single-input/single-output fuzzy logic control block and a single-input/single-output PID control block, respectively, connected to appropriate analog input (AI) and analog output (AO) function blocks, which may be associated with process control devices such as valves, with measurement devices such as temperature and pressure transmitters, or with any other device within the process control system 10. The advanced control loop 36 is illustrated as including an advanced control block 38 having inputs communicatively connected to numerous AI function blocks and outputs communicatively connected to numerous AO function blocks, although the inputs and outputs of the advanced control block 38 may be communicatively connected to any other desired function blocks or control elements to receive other types of inputs and to provide other types of control outputs. As will be described further, the advanced control block 38 may be a control block that integrates a model predictive control routine with an optimizer to perform optimized control of the process or a portion of the process. While the advanced control block 38 will be described herein as including a model predictive control (MPC) block, the advanced control block 38 could include any other multiple-input/multiple-output control routine or procedure, such as a neural network modeling or control routine, a multi-variable fuzzy logic control routine, etc. It will be understood that the function blocks illustrated in FIG. 1, including the advanced control block 38, can be executed by the controller 11 or, alternatively, can be located in and executed by any other processing device, such as one of the workstations 13 or even one of the field devices 19-22.

As illustrated in FIG. 1, one of the workstations 13 includes an advanced control block generation routine 40 that is used to create, download and implement the advanced control block 38. While the advanced control block generation routine 40 may be stored in a memory within the workstation 13 and executed by a processor therein, this routine (or any part thereof) may additionally or alternatively be stored in and executed by any other device within the process control system 10, if so desired. Generally speaking, the advanced control block generation routine 40 includes a control block creation routine 42 that creates an advanced control block and that connects this advanced control block into the process control system, a process modeling routine 44 that creates a process model for the process or a portion thereof based on data collected by the advanced control block, a control logic parameter creation routine 46 that creates control logic parameters for the advanced control block from the process model and that stores or downloads these control logic parameters in the advanced control block for use in controlling the process and an optimizer routine 48 that creates an optimizer for use with the advanced control block. It will be understood that the routines 42, 44, 46 and 48 can be made up of a series of different routines, such as a first routine that creates an advanced control element having control inputs adapted to receive process outputs and having control outputs adapted to provide control signals to process inputs, a second routine that enables a user to download and communicatively connect the advanced control element within the process control routine (which may be any desired configuration routine), a third routine that uses the advanced control element to provide excitation waveforms to each of the process inputs, a fourth routine that uses the advanced control element to collect data reflecting the response of each of the process outputs to the excitation waveforms, a fifth routine that selects or enables a user to select a set of inputs for the advanced control block, a sixth routine that creates a process model, a seventh routine that develops advanced control logic parameters from the process model, an eighth routine that places the advanced control logic and, if needed, the process model within the advanced control element to enable the advanced control element to control the process and a ninth routine that selects or enables a user to select an optimizer for use in the advanced control block 38.

Figure 2:
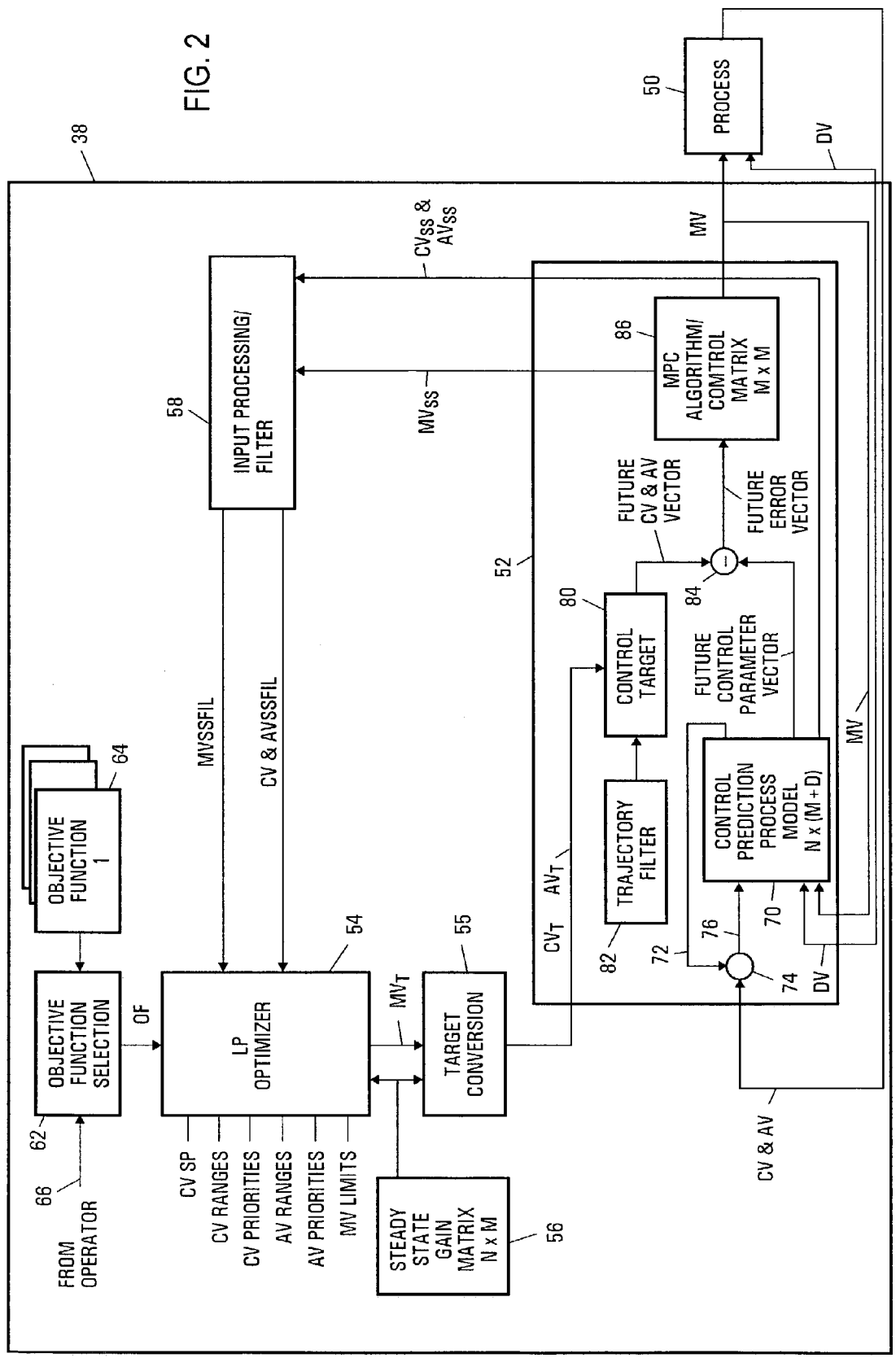
FIG. 2 is a block diagram of the advanced controller function block of FIG. 1 having an integrated optimizer and MPC controller.

FIG. 2 illustrates a more detailed block diagram of one embodiment of the advanced control block 38 communicatively coupled to a process 50, it being understood that the advanced control block 38 produces a set of manipulated variables MVs that are provided to other function blocks which, in turn, are connected to control inputs of the process 50. As illustrated in FIG. 2, the advanced control block 38 includes an MPC controller block 52, an optimizer 54, a target conversion block 55, a step response model or control matrix 56 and an input processing/filter block 58. The MPC controller 52 may be any standard, square M by M (where M can be any number equal to or greater than one) MPC routine or procedure having the same number of inputs as outputs. The MPC controller 52 receives, as inputs, a set of N control and auxiliary variables CV and AV (which are vectors of values) as measured within the process 50, a set of disturbance variables DV which are known or expected changes or disturbances provided to the process 50 at some time in the future and a set of steady state target control and auxiliary variables $CV_T$ and $AV_T$ provided from the target conversion block 55. The MPC controller 52 uses these inputs to create the set of M manipulated variables MV (in the form of control signals) and delivers the manipulated variable MV signals to control the process 50.

Still further, the MPC controller 52 calculates and provides a set of predicted-steady state control variables $CV_{SS}$ and auxiliary variables $AV_{SS}$ along with a set of predicted steady state manipulated variables $MV_{SS}$ representing the predicted values of the control variables CV, the auxiliary variables AV and the manipulated variables MV, respectively, at the prediction horizon (for the CVs and AVs) and the control horizon (for the MVs), to the input processing/filter block 58. The input processing/filter block 58 processes the determined predicted steady state values of the control, auxiliary and manipulated variables $CV_{SS}$, $AV_{SS}$ and $MV_{SS}$ to reduce the effects of noise and unpredicted disturbances on these variables. It will be understood that the input processing/filter block 58 may include a low pass filter or any other input processing that reduces the effects of noise, modeling errors and disturbances on these values and provides the filtered control, auxiliary and manipulated variables $CV_{SSfil}$, $AV_{SSfil}$ and $MV_{SSfil}$ to the optimizer 54.

The optimizer 54 is, in this example, a linear programming (LP) optimizer that uses an objective function (OF) that may be provided from a selection block 62 to perform process optimization. Alternatively, the optimizer 54 could be a quadratic programming optimizer which is an optimizer with a linear model and a quadratic objective function. Generally speaking, the objective function OF will specify costs or profits associated with each of a number of control, auxiliary and manipulated variables (which are referred to generally as process variables) and the optimizer 54 determines target values for those variables by finding a set of process variables that maximize or minimize the objective function. The selection block 62 may select the objective function OF provided to the optimizer 54 as one of a set of pre-stored objective functions 64 which mathematically represent different manners of defining optimal operation of the process 50. For example, one of the pre-stored objective functions 64 may be configured to maximize the profit of the plant, another one of the objective functions 64 may be configured to minimize the use of a particular raw material that is in short supply while a still further one of the objective functions 64 may be configured to maximize the quality of the product being manufactured within the process 50. Generally speaking, the objective function uses a cost or profit associated with each move of a control, auxiliary and manipulated variable to determine the most optimal process operating point within the set of acceptable points as defined by the set point values or ranges of the control variables CV and the limits of the auxiliary and manipulated variables AV and MV. Of course, any desired objective function can be used instead of or in addition to those described herein including objective functions which optimize each of a number of concerns, such as use of a raw material, profitability, etc. to some degree.

A user or operator may select one of the objective functions 64 by providing an indication of the objective function 64 to be used on an operator or user terminal (such as one of the workstations 13 of FIG. 1), which selection is provided via an input 66 to the selection block 62. In response to the input 66, the selection block 62 provides the selected objective function OF to the optimizer 54. Of course, the user or operator can change the objective function being used during operation of the process. If desired, a default objective function may be used in cases in which the user does not provide or select an objective function. One possible default objective function will be discussed in more detail below. While illustrated as being part of the advanced control block 38, the different objective functions may be stored in the operator terminal 13 of FIG. 1 and one of these objective functions may be provided to the advanced control block 38 during the creation or generation of this block.

In addition to the objective function OF, the optimizer 54 receives, as inputs, a set of control variable set points (which are typically operator specified set points for the control variables CV of the process 50 and may be changed by the operator or other user) and a range and weight or priority associated with each of the control variables CV. The optimizer 54 additionally receives a set of ranges or constraint limits and a set of weights or priorities for the auxiliary variables AV and a set of limits for the manipulated variables MV being used to control the process 50. The optimizer 54 may also receive set points, preferred operating ranges, ideal resting values, or other limits associated with one or more of the process variables. Generally speaking, the ranges for the auxiliary and manipulated variables define the limits (typically based on physical properties of the plant) for the auxiliary and manipulated variables while the ranges for the control variables provide a range in which the control variables may operate for satisfactory control of the process. The weights for the control, auxiliary and manipulated variables may specify the relative importance of the control variables, the auxiliary variables and the manipulated variables with respect to one another during the optimization process and may be used, in some circumstances, to enable the optimizer 54 to generate a control target solution if some of the constraints or limits associated with these variables need to be violated.

During operation, the optimizer 54 may use a linear programming (LP) technique to perform optimization. As is known, linear programming is a mathematical technique for solving a set of linear equations and inequalities that maximizes or minimizes a certain additional function called the objective function. As discussed above, the objective function may express economic value like cost or profit but may express other objectives instead or in addition to economic objectives. Additionally, as discussed below, the objective function may be tailored to include costs or penalties associated with violating constraints or limits to enable the objective function to be used to determine an acceptable solution when there is no solution that keeps all of the CVs, the AVs and the MVs within the pre-set limits.

As will be understood, the steady state gain matrix defines the steady state gain for each possible pair of the manipulated variables and the control or auxiliary variables. In other words, the steady state gain matrix defines the steady state gain in each control and auxiliary variable for a unit change in each of the manipulated and disturbance variables. This steady state gain matrix is generally an N by M matrix, where N is the number of control and auxiliary variables and M is the number of manipulated variables used in the optimizer routine. Generally, N can be greater than, equal to, or less than M, with the most common case being that N is greater than M.

Using any known or standard LP algorithm or technique, the optimizer 54 generally iterates to determine the set of target manipulated variables $MV_T$ (as determined from the steady state gain matrix) which maximize or minimize the selected objective function OF while resulting, if possible, in process operation that meets or falls within the control variable CV set point range limits, the auxiliary variable AV constraint limits and the manipulated variable MV limits. In one embodiment, the optimizer 54 actually determines the change in the manipulated variables and uses the indication of the predicted steady state control variables, auxiliary variables and manipulated variables $CV_{SSfil}$, $AV_{SSfil}$ and $MV_{SSfil}$ to determine the changes in the process operation from its current operation, that is, to determine the dynamic operation of the MPC control routine during the process of reaching the target or optimal process operating point. This dynamic operation is important as it is desirable to assure that none of the constraint limits is violated during the move from the current operating point to the target operating point.

In one embodiment, the LP optimizer 54 may be designed to minimize an objective function of the following form:

$$Q = P^{t} * A * \Delta MV + C^{t} \Delta MV \tag{1}$$

wherein:
Q=total cost/profit;
P profit vector associated with the AVs and CVs;
C cost vector associated with MVs;
A Gain matrix; and
$\Delta MV$=vector for calculated change in MVs.

The profit values are generally positive numbers and the cost values are generally negative numbers to indicate their influence on the objective. Using this or any other objective function, the LP optimizer 54 calculates the changes in the manipulated variables MV that minimize the objective function while insuring that the control variables CV remain within a range from their target set point, that the auxiliary variables AV are within their upper and lower constraint limits and that the manipulated variables MV are within their upper and lower limits.

In one optimization procedure that can be used, incremental values of manipulated variables are used at the present time (t) and a sum of increments of manipulated variables are used over the prediction horizon with incremental values of control and auxiliary variables being determined at the end of prediction horizon, instead of positional current values, as is typical in LP applications. Of course, the LP algorithm may be appropriately modified for this variation. In any event, the LP optimizer 54 may use a steady state model and, as a result, a steady state condition is generally required for its application. With a prediction horizon as normally used in MPC design, future steady state is guaranteed for a self-regulating process. One possible predicted process steady state equation for an m by n input-output process, with prediction horizon p, control horizon c, expressed in the incremental form is:

$$\Delta CV(t+p) = A * \Delta MV(t+c) \tag{2}$$

wherein:

$$\Delta CV(t+p) = \begin{bmatrix} \Delta cv_1 \\ \dots \\ \Delta cv_n \end{bmatrix}$$

denotes predicted changes in outputs at the end of prediction horizon (t+p), $$A = \begin{bmatrix} a_{11} \dots a_{1m} \\ \dots \\ a_{n1} \quad a_{nm} \end{bmatrix}$$

is the process steady state m by n gain matrix, and $$\Delta MV(t+c) = \begin{bmatrix} \Delta mv_1 \\ \dots \\ \Delta mv_m \end{bmatrix}$$

denotes changes in manipulated variables at the end of control horizon (t+c)

The vector $\Delta MV(t+c)$ represents the sum of the changes over the control horizon made by every controller output $mv_i$ so that.

$$\Delta mv_i = \sum_{j=1}^{c} mv_i(t+j) \quad i = 1, 2, \dots, m \tag{3}$$

The changes should preferably satisfy limits on both the manipulated variables MV and the control variables CV (here auxiliary variables are treated as control variables) so that:

$$MV_{min} \leq MV_{current} + \Delta MV(t+c) \leq MV_{max} \tag{4}$$

$$CV_{min} \leq CV_{predicted} + \Delta CV(t+p) \leq CV_{max} \tag{5}$$

In this case, the objective function for maximizing product value and minimizing raw material cost can be defined jointly as:

$$\underset{min}{Q} = -UCV^T * \Delta CV(t+p) + UMV^T * \Delta MV(t+c) \tag{6}$$

wherein:
UCV is the cost vector for a unit change in the control variable CV process value; and
UMV is the cost vector for a unit change in the manipulated variables MV process value.

Applying the equation (1) above, the objective function can be expressed in terms of manipulated variables MV as:

$$\underset{min}{Q} = -UCV^T * A * \Delta MV(t+c) + UMV^T * \Delta MV(t+c) \tag{7}$$

To find an optimal solution, the LP algorithm calculates the objective function for an initial vertex in the region defined by equation (7) and improves the solution every next step until the algorithm determines the vertex with the maximum (or minimum) value of the objective function as an optimal solution. The determined optimal manipulated variable values are then applied or provided to the controller as the target manipulated variables $MV_T$ to be achieved within control horizon.

Generally speaking, running the LP algorithm on the prepared matrix returns three possible results. First, there is a unique solution for the target manipulated variables $MV_T$. Second, the solution is unbounded, which should not happen if each control and auxiliary variable has a high and a low limit. Third, there is no solution that meets the limits on the process variables, which means that the boundaries or constraints on the process variables are too tight. To handle the third case, the overall constraints may be relaxed and the optimizer may be run again with the relaxed constraints to obtain a solution. The basic assumption is that the limits on manipulated variables (High/Low limits) can not be changed by optimizer, although this assumption need not be true. The same assumption may also be used for constraints or limits on the auxiliary variables (High/Low limits). However, the optimizer can change from driving the control variable CV to the specified set points (CV set point control) to driving the control variables to any of the values within a range from or around the set point (CV range control). In this case, the values of the control variables are allowed to be placed within a range rather than at a specific set point. If there are several auxiliary variables AV violating their constraints, and switching from CV set point control to CV range control does not provide a solution, it is also possible to relax or to ignore the constraints of the auxiliary variables based on the provided weights or priority designations. In one embodiment, a solution could be determined by minimizing the squared error of the auxiliary variables allowing each of them to violate their respective constraint or by abandoning constraints of the auxiliary variables with lowest priority in a sequential manner. As will be described in more detail below, other manners of dealing with out-of-limits solutions include altering the objective function to include slack variables or penalty variables that asses a cost or penalty for each process variable that violates a pre-set limit or constraint and rerunning the optimizer with the new objective function and/or redefining the limits for one or more process variables that are out of limits, altering the objective function to include penalties for the process variables within the new limits to drive those variables towards the original limits and rerunning the optimizer with the new objective function to find the optimal solution within those redefined limits. First, however, one method of initially selecting an objective function will be described.

As noted above, the objective function OF may be chosen or set by default by the control block generation program 40. While it is desirable to provide the ability to optimize, many situations may only require that set points for the control variables be maintained in a manner that still observes the operating constraints of the auxiliary variables and manipulated variables. For these applications, the block 38 may be configured to operate solely as an MPC function block. To enable this ease of use, a default "Operate" objective function may be automatically created with default costs assigned to the different variables therein along with-default auxiliary variable AV weights. These defaults may set all costs for the auxiliary variables AV and the manipulated variables MV equal or provide some other predetermined cost assignment to the auxiliary and manipulated variables AV and Mv. When an expert option is selected, then the user may create additional optimization selections and define their associated costs for the different objective functions 64. The expert user may also be allowed to modify the default auxiliary variable AV and control variable CV weights of the default objective function as well as constraint limit or set point range violation costs, which are described in more detail below and which may be used by the optimizer when the optimizer can not initially find a feasible solution.

In one embodiment when, for example, economics are not defined for the process configuration, the objective function may be constructed from the MPC configuration automatically. In general, the objective function may be constructed using the following formula.

$$CD^T = C^T + P^T * A \qquad (8)$$

$$= [C_1, \ldots, C_j, \ldots, C_m] +$$

$$\left[ \sum_{i=1}^{n} p_i a_{i1}, \sum_{i=1}^{n} p_i a_{i2}, \ldots, \sum_{i=1}^{n} p_i a_{im} \right]$$

$$= [CD_1, \ldots, CD_j, \ldots, CD_m]$$

The variables $C_j$ and $p_j$ can be defined from the configuration settings. In particular, assuming that the control variable CV set point can be defined at a low limit (LL) or a high limit (HL) only, the $p_j$ value may be defined in the following manner:

$p_j = -1$ if set point is defined at LL or minimize is selected; and $p_j = 1$ if set point is defined at HL or maximize is selected.

Assuming no configuration information is entered for the auxiliary variables AV, $p_j = 0$ for all auxiliary variables AV. Similarly for the manipulated variables MV, the $C_j$ value depends on whether or not the preferred manipulated variable target $MV_T$ is defined. Where the preferred manipulated target $MV_T$ is defined:

$C_j = 1$ if $MV_T$ is at the HL or maximize is selected;
$C_j = -1$ if $MV_T$ is at the LL or minimize is selected; and
$C_j = 0$ if $MV_T$ is not defined.

If desired, the selection of the use of the optimizer 54 in conjunction with the MPC controller 52 may be adjustable to thereby provide a degree of optimization. To perform this function, the change in the manipulated variables MV used by the controller 52 can be altered by applying different weights to the change in the manipulated variables MV determined by the MPC controller 52 and the optimizer 54. Such a weighted combination of the manipulated variables MV is referred to herein as an effective MV ($MV_{eff}$). The effective $MV_{eff}$ can be determined as:

$$\Delta MV_{eff} = \Delta MV_{mpc}(1+\alpha/S) + \Delta MV_{opt}(1-\alpha) \quad 0 < \alpha < 1 \qquad (9)$$

where S is arbitrarily or heuristically selected. Typically, S will be greater than one and may be in the range of ten. Here, with $\alpha = 1$, the optimizer contributes to the effective output as it was set at the generation. With $\alpha = 0$, the controller provides MPC dynamic control only. Of course, the range between 0 and 1 provides different contributions of optimizer and MPC control.

The above described default objective function may be used to establish the operation of the optimizer during different possible operational modes thereof. In particular, when the number of control variables CVs match the number of manipulated variables MVs, the expected behavior with the default setting is that the control variable CV set points will be maintained as long as auxiliary variables AVs and the manipulated variables MVs are projected to be within their limits. If it is predicted that an auxiliary variable or a manipulated variable will violate its limit, then the control variable working set points can be changed within their range to prevent these limits from being violated, if possible. If, in this case, the optimizer 54 can not find a solution that satisfies the auxiliary and manipulated variable limits while maintaining the control variables within their range, then control variables may be maintained within their range while the auxiliary and/or manipulated variables are allowed to deviate from their constraint limits. In finding the best solution, those auxiliary variables AVs and manipulated variables MVs that are projected to violate a limit may be treated equally and their average limit deviation minimized. To achieve this behavior, the default cost/profit used by the objective function may automatically be set so that the control variables CV will be assigned a profit of 1 if the range is defined to allow deviation below the set point and a profit of −1 if the range is defined to allow deviation above the set point. The auxiliary variables AVs within limits may be assigned a profit of 0 and the manipulated variables MVs may be assigned a cost of 0. Alternatively, the auxiliary variables may be assigned a profit of 1 or −1 and the manipulated variables may be assigned a cost of 0.1.

When the number of control variables CVs is less than number of manipulated variables MVs, then the extra degrees of freedom can be used to address the requirements associated with the configured manipulated variable's MV final resting position. Here, the control variable set points (if any control variable CV set points are defined) can be maintained as long as the auxiliary and manipulated variables are projected to be within their limits. The average deviation of the manipulated variables from the configured final resting position will be minimized. If one or more of the auxiliary and manipulated variables are predicted to violate their limits, then the control variable working set points may be changed within their ranges to prevent these limits from being violated. Under this condition, if multiple solutions exist, then the one used for the control may be the one that minimizes the average deviation of the manipulated variables from configured the final resting position.

In normal situations, the target set points developed by the optimizer 54 in the manner described above will be within acceptable ranges and the manipulated, auxiliary and control variables will remain within the preset limits or ranges. However, when the disturbances are too severe to be compensated within constraint limits, some constraints will be violated, in which case, the optimizer 54 may not be able to find a feasible solution (i.e., one in which none of the constraints or limits is violated) using the default or selected objective function with the set point relaxation techniques described above. Possible manners of providing optimization in these circumstances include abandoning any optimization action and dropping lower priority constraints.

While abandoning optimization is the simplest possible manner of dealing with an infeasible solution, it is not the best method of handling constraints because, when there is no feasible solution within limits, it is still possible in the most cases to minimize constraint violations taking optimization objectives into account. Furthermore, dropping lower priority constraints is an extreme action that, while helping to keep higher priority constraints met, may cause excessive uncontrolled departure from the limits of the dropped constraints, which may be unacceptable. Another problem with dropping lower priority constraints is that it is necessary to estimate how many lower priority constraints must be dropped to get a solution. Such an estimate is based on the degrees of freedom available within the system, which estimate must be calculated before the optimization procedure or must be determined during the procedure. In the later case, the process of developing an optimal solution by sequentially dropping constraints may need to be repeated until a solution is found, and such an open-ended iterative process is not desirable in most real time optimization applications.

However, it has been discovered that, in some situations, it is still possible to find an acceptable solution when the objective function is originally configured such that no feasible solution exits, by assigning a penalty within the objective function for each constraint violation dependant on the priority of the variable and the size of the constraint violation (commonly referred to as using slack variables in the objective function), by redefining the constraint limits for one or more process variables and redefining the objective function to drive the process variable using the redefined limits towards the previous limit while not allowing other process variables to violate their original constraints or limits, or a combination of both of these techniques.

More particularly, infeasible optimizer solutions may be handled using the well known concept of slack variables. This technique assigns penalties dependant on one or both of the priority of the constraint being violated and the size of the limit violation. While generally, it has been suggested in the prior art that it is possible to use slack variables in optimizing in the presence of controller constraint limit violations, the inventors know of no specific disclosure on a manner of doing this. Thus, the technique described below has been developed by the inventors to use slack variables to redefine an objective function used by an optimizer when constraint violations are necessarily present within the solution developed using the original objective function.

Generally speaking, slack variables are defined as the value or magnitude by which the predicted process variable exceeds (is above or below) the limit being violated. To minimize the slack variable (and thereby minimize the limit violation) the objective function used by the optimizer is redefined to include a penalty for each non-zero slack variable value which, in effect, causes the optimizer to find a solution that minimizes the slack variable in conjunction with the other objectives, such as economic objectives, defined by the objective function. According to this technique, when the optimizer experiences a situation in which it can only provide infeasible solutions, the objective function is redefined to include a cost or penalty associated with a limit violation for each process variable (e.g., manipulated, auxiliary or control variable) or at least for each process variable that is projected to violate a pre-set limit. If desired, the same or a different penalty may be defined for each of the process variables so that the objective function includes a slack variable that defines a cost or a penalty resulting from each limit violation for each process variable that violates an associated limit. The slack variable cost or penalty within the redefined objective function may be dependent on the magnitude of the limit violation as well as the process variable in which the limit violation occurs. The unit costs or penalties may, for example, be higher for higher priority process variable limits and lower for lower priority process variable limits. In any event, the redefined objective function is then used to find an optimal solution by minimizing (or maximizing) the redefined objective function in the presence of both the previously defined economic factors (profits and costs) as well as the costs or penalties associated with the presence of non-zero slack variables for one or more of the process variables.

More particularly, in linear programming, slack variable vectors $S_{max} \geq 0$ and $S_{min} \geq 0$ may be used as follows:

$$CV_{predicted} + A * \Delta MV(t+c) = CV_{min} + S_{min} \quad (10)$$

$$CV_{predicted} + A * \Delta MV(t+c) = CV_{max} - S_{max} \quad (11)$$

Here, it will be understood that AVs are included in the CV terms in these equations (i.e., the CVs variables cover all outputs whether control variables are auxiliary variables). The equality is required in equations (10) and (11) for the linear programming model and the slack variables $S_{min}$ and $S_{max}$ serve only as supporting formal parameters with no specific application meaning. In this application, additional slack variables $S^+$ and $S^-$ are used to extend the limits range on the slack vector, where $S^+ \geq 0$ is used for the high limit increase and $S^- \geq 0$ is used for the low limit decrease. Effectively the equations (10) and (11) may be redefined or restated as:

$$CV_{predicted} + A * \Delta MV(t+c) = CV_{min} + S_{min} - S^- \quad (12)$$

$$CV_{predicted} + A * \Delta MV(t+c) = CV_{max} - S_{max} + S^+ \quad (13)$$

where the values $S^-$ and $S^+$ are the values by which the predicted process variable violates the lower and upper constraint limits, respectively. With this definition, the new slack variables $S^-$ and $S^+$ are used to define penalization factors within the objective function to obtain a LP solution within ranges or with only minimal overrun of the ranges. As an example, the objective function may be extended by adding the terms $PS_-^T * S^-$ and $PS_+^T * S^+$ so that:

$$Q_{min} = -UCV^T * \Delta CV(t+p) + \quad (14)$$

$$UMV^T * \Delta MV(t+c) + PS_-^T * S^- + PS_+^T * S^+$$

wherein:
$PS_-$ is the slack variable penalty vector for violating low limits;
$PS_+$ is the slack variable penalty vector of violating high limits; and
$PS_- >> UCV$ and $PS_+ >> UCV$ (wherein the symbol>>means much greater than).

Thereafter, the newly defined objective function may be used in a standard manner so that minimizing the newly defined objective function will minimize the values $S^-$ and $S^+$ as defined by costs associated with these values to obtain a solution which is optimal in the sense that it reduces the limit overruns optimally with respect to the other objects of the objective function.

Generally speaking, the penalties associated with the slack variables $S^-$ and $S^+$ should be significantly higher than the economic costs or profits being optimized within or associated with the objective function. Thus, the vectors $PS_-$ and $PS_+$ (which define the penalties associated with the different slack variables) should have all of the components thereof significantly larger than economic cost/profit vectors used in the objective function. It is reasonable to assume that, in general, the smallest component of the vectors $PS_-$ and $PS_+$ should be several times greater than the largest component of the UCV vector. Thus, as described herein, the slack variables should be highly penalized within the objective function as compared to the economic costs, profits, etc.

Figure 5:
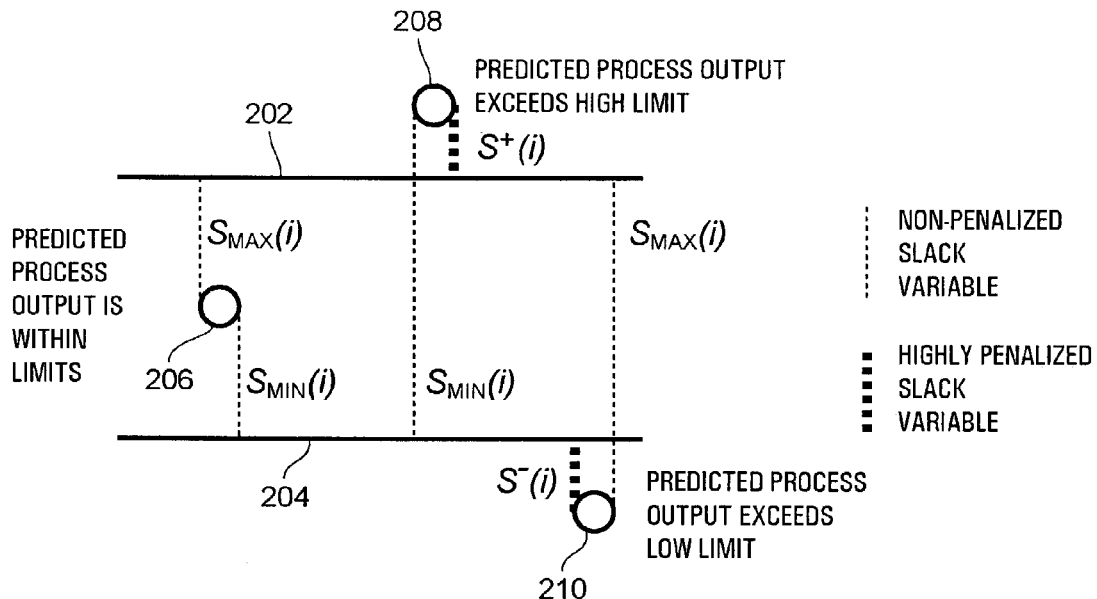
FIG. 5 is a graphical depiction illustrating a manner of relaxing a manipulated variable constraint or limit using slack variables within an objective function of the optimizer of FIG. 2.

FIG. 5 graphically illustrates the use of slack variables for dealing with constraint violations of a process variable (with no associated set point). In particular, FIG. 5 illustrates the values for $S_{max}(i)$, $S_{min}(i)$ for the cases in which (1) the predicted process variable is within the predefined constraint limits (defined by the lines 202 and 204), as illustrated by the point 206, (2) the predicted process variable is above the maximum constraint limit 202, as illustrated by the point 208, and (3) the predicted process variable is below the minimum constraint limit 204, as illustrated by the point 210. In the first case (associated with the point 206), the value of $S^+(i)$ and $S^-(i)$ are zero because the upper and lower constraint limits are not violated. In this case, no penalty is provided to or associated with the process variable in the objective function. However, in the second case (illustrated by the point 208), the value of $S^+(i)$ is non-zero because the point 208 exceeds the high limit 202. The bold dotted line illustrates the value of the slack variable $S^+(i)$ which is the value that will be multiplied by a unit cost associated with an upper limit violation for this process variable in the objective function. Similarly, in the third case (illustrated by the point 210), the value of $S^-(i)$ is non-zero as the point 210 exceeds the low limit 204. The bold dotted line here illustrates the value of the slack variable $S^-(i)$ which is the value that will be multiplied by a unit cost associated with a lower limit violation for this process variable in the objective function. Of course, FIG. 5 illustrates a single time associated with a signal process variable and it will be understood that the redefined objective function minimizes the constraint violations over the time to the control horizon.

In addition to (or instead of) minimizing constraint limit violations as described above, the optimizer may use penalized slack variables to provide for set point optimization either in the case in which a non-feasible solution is found or in the case in which it is desired to optimize to a set point for other reasons. In particular, penalized slack variables may be used to allow set points to be relaxed within acceptable ranges defined around a pre-selected set point (e.g., a set point provided by the operator, or some other source) in response to an infeasible solution or for any other desired reason so as to enable other process variables to meet or come closer to meeting their associated limits. The set point ranges could include a high range (in which the set point is allowed to deviate within a range above the pre-selected set point), a low range (in which the set point is allowed to deviate within a range below the pre-selected set point), or both. The set point ranges used in this technique can be single sided or two sided. Single sided ranges may be associated with a minimize or a maximize objective function which defines a penalty in the objective function for deviating outside of a pre-selected set point range but which provides only economic costs in the objective function for deviation from the set point within the set point range. Two sided ranges, on the other hand, will typically have no economic objectives, but are used to obtain the optimal solution as close as possible to the pre-selected set point within a preferred range that may be extended by using highly penalized slack variables outside of the range. If the preferred set point range is equal to zero, the situation is essentially the same as a set point with the penalized slack variables around it.

Figure 6:
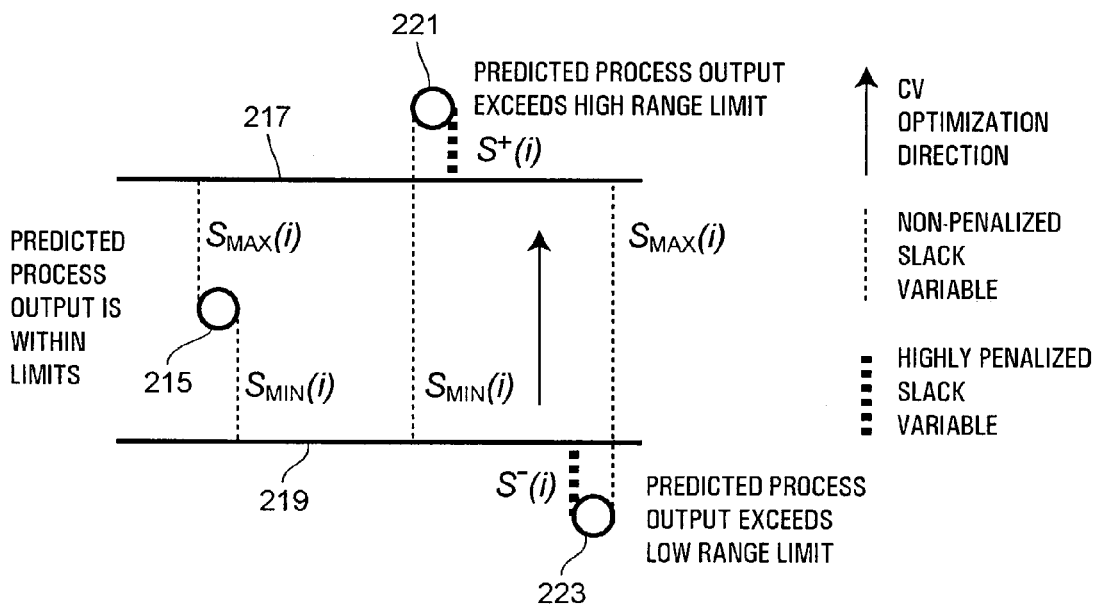
FIG. 6 is a graphical depiction illustrating a manner of relaxing ranges associated with a set point using slack variables within the objective function of the optimizer of FIG. 2.
Figure 7:
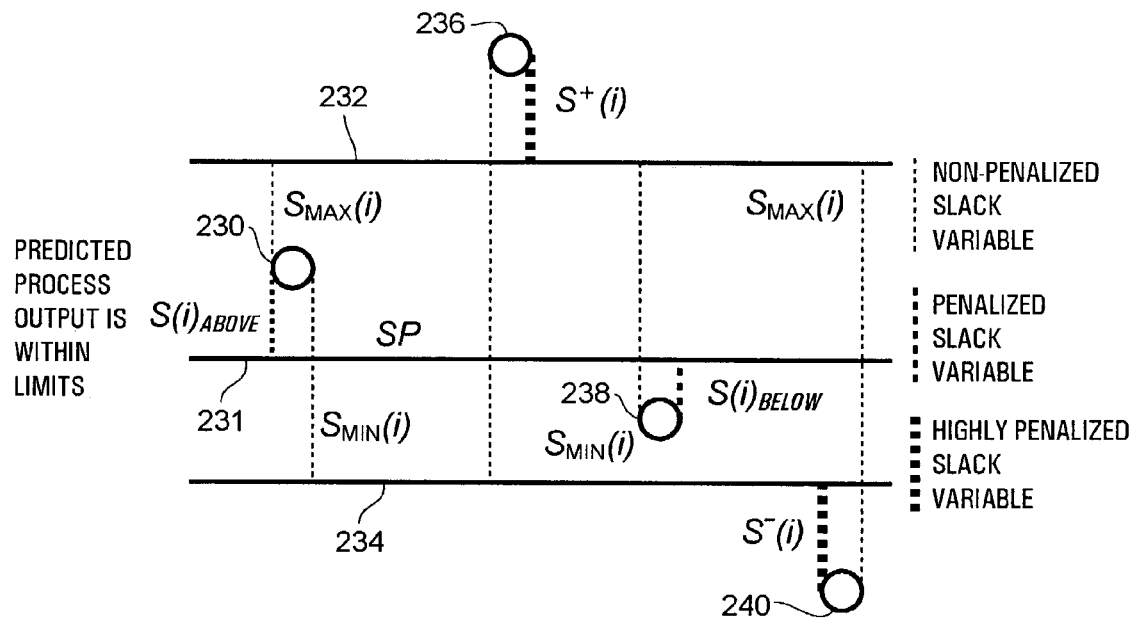
FIG. 7 is a graphical depiction illustrating a manner of relaxing two sets of ranges associated with a set point using lower and higher penalized slack variables within the objective function of the optimizer of FIG. 2.

FIGS. 6 and 7 respectively illustrate the use of slack variables without and with the use of an extended range. Referring to FIG. 6, a point 215 illustrates a set point for a process variable within a range defined by the lines 217 and 219. No slack variable penalty is associated with the deviation from the set point within the range bounded by the lines 217 and 219. However, as illustrated for a point 221, when the process variable exceeds the upper range limit 217, a penalized slack variable $S^+(i)$ is used to assess a penalty for this deviation within the objective function, in the manner similar to the use of slack variables in the constraint violation situations discussed above. Similarly, as illustrated for a point 223, when the process variable exceeds the lower range limit 219, a penalized slack variable $S^-(i)$ is used to assess a penalty to this deviation within the objective function, in the manner similar to the use of slack variables in constraint violation situations described above.

FIG. 7 illustrates the use of slack variables in an extended range situation in which a first slack variable penalty is assessed for deviations from the set point within a first range and highly penalized slack variables (with highly penalized costs) are used to extend the possible range of the set point outside of the first range. In particular, a point 230 illustrates the situation when the predicted process variable is above a pre-selected set point 231 but within a pre-set allowed range defined by the lines 232 and 234. Here, a variable $S(i)_{above}$ is used to define the penalty associated with the deviation of the point 230 from the pre-set set point 231. As indicated by the dotted line, the non-zero value of the $S(i)_{above}$ variable is penalized in the objective function. The point 236, on the other hand, illustrates the use of highly penalized slack variables when the manipulated variable associated with the set point exceeds the upper pre-set range limit 232 by a value $S^+(i)$. Here the large bold dotted line indicates that the $S^+(i)$ variable is highly penalized, as compared with the $S(i)_{above}$ variable, within the objective function to make deviations outside of the range limit 232 much more penalized then deviations from the set point 231 within the range limit 232.

In a similar manner, a point 238 illustrates the situation when the predicted process variable is below the pre-selected set point 231 but within a pre-set allowed range defined by the lines 232 and 234. Here, a variable $S(i)_{below}$ is used to define the penalty associated with the deviation of the point 238 from the pre-selected set point 231. As indicated by the dotted line, the non-zero value of the $S(i)_{below}$ variable is penalized in the objective function. Additionally, a point 240 illustrates the use of highly penalized slack variables when the process variable associated with the set point exceeds the lower pre-set range limit 234 by a value $S^-(i)$. Here, the large bold dotted line again indicates that the $S^-(i)$ variable is highly penalized as compared with the $S(i)_{below}$ variable, within the objective function to make deviations outside of the range limit 234 much more penalized then deviations from the set point 231 within the range limit 234.

The equations for the set point control with the two-sided ranges may represented in the form:

$$CV_{predicted} + A^* \Delta MV(t+c) = SP - S_{below} + S_{above} \quad (15)$$

$$CV_{predicted} + A^* \Delta MV(t+c) = CV_{min} + S_{min} - S^- \quad (16).$$

$$CV_{predicted} + A^* \Delta MV(t+c) = CV_{max} - S_{max} + S^+ \quad (17)$$

Here, $S_{below}$ and $S_{above}$ are vectors of slack variables for the solutions below and above the set points and the terms $PSP_{below}{}^T * S_{below} + PSP_{above}{}^T * S_{above}$ should be added to the objective function, wherein:

$PSP_{below}{}^T$ is unit penalty for the solution below the set point; and $PS_{above}{}^T$ is unit penalty for the solution above the set point.

As will be understood, the objective function will also include the slack variable penalties for the $S^-$ and $S^+$ variables as defined above.

This technique for handling constraints with penalized slack variables provides significant flexibility in handling infeasible situations. In particular, by applying penalized slack variables, the optimizer can always find an optimal solution that minimizes the overall constraint violation costs, as defined by the objective function, even if the solution is outside of the pre-selected limits or constraints. However, some process variable outputs which are within limits prior to running the redefined optimizer with the penalized slack variables may go out of limits as a result of the solution using slack variables. Furthermore, the amount of limit overrun for a particular process variable is not quantitatively defined prior to generating the solution. These two features may not be desirable in many applications because some applications may require that the lower priority process variables that are initially within range limits not be driven out of limits to bring higher priority process variables within limits. Moreover, some applications may require well-defined solution limits for all of the process variables. These two objectives may be satisfied by redefining the constraint model in response to an infeasible situation or solution.

In particular, to handle infeasibilities in a manner that enforces strictly defined degrees of limit violations, the constraint model itself may be redefined. Of course, this redefining takes place after the first optimization run, if penalized slack variables are not used and there is no solution within original limits or if penalized slack variables are used, but the solution with penalized slack variables is not acceptable. Generally speaking, the redefined limits are set as the value of the predicted process variable (e.g., a control variable CV), which violates an original limit and the original limit less some nominal value. These newly defined limits are then used in a second optimization run to find a solution which does not violate the new redefined limits while minimizing or maximizing the objective function. This limit re-definition prevents the process variable that violates an original limit from becoming worse while simultaneously preventing other process variables that did not violate their original preset limits from doing so in the second optimization run. However, the process variables are still optimized within the original limits (if the predicted value of the process variable did not violate the original limit) or within the newly defined limits (if the predicted value of the process variable did violate the original limit) to provide for a bounded optimized solution in the presence of limit violations.

This technique may be defined mathematically for a control variable CV as follows: If there is no solution and a high limit $CV^{HL}$ is exceeded, then new limits for the CV are defined as:

$$CV^{HL'} = CV^{prediction}$$

$$CV^{LL'} = CV^{HL} - \Delta$$

wherein $\Delta = 1\text{-}3\%$ to avoid a solution exactly at the original limit.

Similarly when a low limit $CV^{LL}$ is exceeded, the new limits are defined as:

$$CV^{LL'} = CV^{prediction}$$

$$CV^{HL'} = CV^{LL} + \Delta$$

Of course, similar limits may be defined for other process variables, such as manipulated variables MV and auxiliary variables AV.

Figure 8:
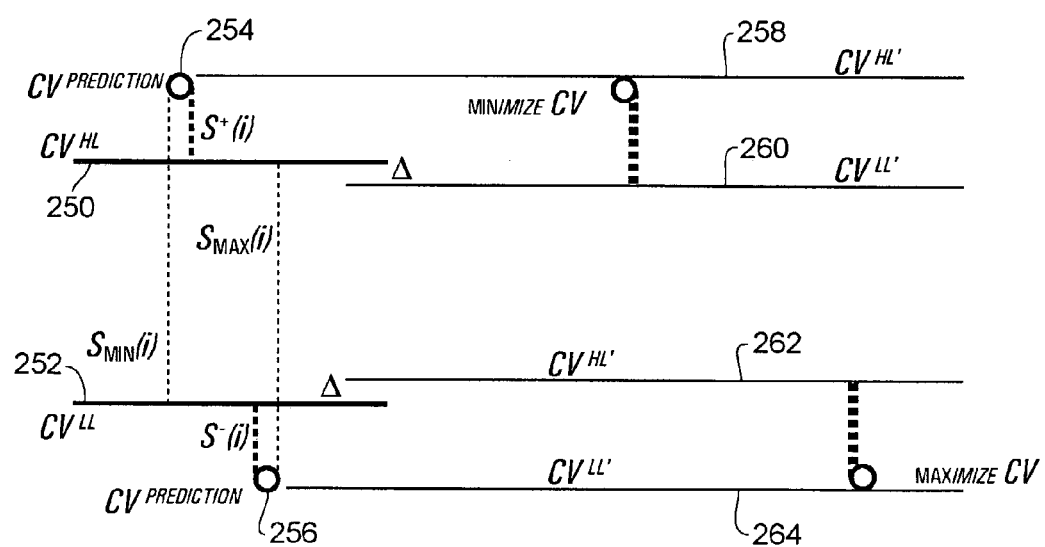
FIG. 8 is a graphical depiction illustrating a manner of redefining the constraint model or constraint limits for a manipulated variable and using penalty variables associated with the new constraint model within the objective function of the optimizer of FIG. 2.

These newly defined limits are generally illustrated in FIG. 8. In particular, the original constraints $CV^{HL}$ and $CV^{LL}$ are illustrated on the left side of FIG. 8 by the lines 250 and 252 and two CV predictions which violate these constraints (and which would be generated by the first pass of the optimizer using the original objective function) are illustrated by the points 254 and 256. Two sets of redefined limits $CV^{HL'}$ and $CV^{LL'}$ are illustrated by the sets of lines 258, 260 and 262, 264. As will be understood, the set of redefined limits 258 and 260 corresponds to the new limits for the point 254 and are bounded by the point 254 on the high side and by the original limit 250 less a delta function on the low side. Similarly, the set of redefined limits 262 and 264 corresponds to the new limits for the point 256 and are bounded by the point 256 on the high side (the most positive side) and by the original limit 252 plus a delta function on the low side (least positive side). These new sets of limits are used in the objective function as new limits for the points 254 or 256 (whichever is appropriate) and the new objective function is not allowed to find a solution outside of those limits. Additionally, a high penalization factor may be assigned based on the distance between the new limit 260 (in the case of the point 254) or the new limit 262 (in the case of the point 256) and the new CV value and used in the new objective function to drive the new CV with the new limits towards the new lower limit 260 (in the case of the point 254) or towards the new upper limit 262 (in the case of the point 256). More particularly, after redefining the constraint handling model or limits, the penalty vector for all the CVs out of the ranges or limits may be recalculated in a way that drives those CVs in the direction of the exceeded limits. To achieve this objective, the penalty for limits violation should override economic criteria and thus the penalties associated with the new limits should be highly penalized variables.

In this manner, new limits are established for each process variable (e.g., CV) that is predicted to be out of limits to provide a bound for the that process variable, but penalization is used in the objective function to drive the process variable in the second pass of the optimizer toward the original limit, to thereby optimize the process variables without violating any limits (either newly defined limits in the case of out of limits process variables or original limits in the case of process variables which do not violate original limits). In this case, however, the limits (either the original limits for process variables that did not violate their original limits in the first pass of the objective function or the redefined limits for the process variables that did violate their original limits in the first pass of the objective function) are bounded and the optimizer will be able to find a solution within these limits.

A general form of an LP objective function using redefined limits and the penalty factors for those limits may be expressed as:

$$(P^T * A + C^T) * (MV^t - MV^{t-1}) \quad (18)$$

where the cost of the process outputs may be expressed by the vector:

$$P^T * A = [p_1, \ldots, p_i, \ldots, p_n] \begin{pmatrix} a_{11} & \cdots & a_{1m} \\ \vdots & \ddots & \vdots \\ a_{n1} & \cdots & a_{nm} \end{pmatrix} \quad (19)$$

$$= \left[ \sum_{i=1}^{n} p_i a_{i1}, \sum_{i=1}^{n} p_i a_{i2}, \ldots, \sum_{i=1}^{n} p_i a_{im} \right]$$

The resulting vector is:

$$CM^T = C^T + P^T * A \quad (20)$$

$$= [C_1, C_2, \ldots, C_m] + \left[ \sum_{i=1}^{n} p_i a_{i1}, \sum_{i=1}^{n} p_i a_{i2}, \ldots, \sum_{i=1}^{n} p_i a_{im} \right]$$

$$= [CM_1, CM_2, \ldots, CM_m]$$

To make constraint handling a priority, an additional penalty $v_i$ for the violated constraint outputs can be defined as a negative value if the process variable (e.g., a CV) exceeds a high limit, and as a positive value if the process variable exceeds a low limit. A contribution of the additional penalty $v_i$ to the cost vector will be:

$$[v_i a_{i1}, v_i a_{i2}, \ldots, v_i a_{im}] = [V_1^i, V_2^i, \ldots, V_m^i] \quad (21)$$

For the constraint handling to take precedence over economics, this vector should have every component greater than the vector $CM^T$. Therefore:

$$|v_i a_{ij}| \geq (|CM_j| + 1)\left(1 - \frac{r_i - r_{\min}}{r_{\max}}\right) \quad j = 1, 2, \ldots, m \quad (22)$$

wherein:

$r_i$ is priority/rank number of redefined CV;

$r_{max}$ is the maximum priority/rank number for the lowest priority/rank; and $r_{min}$ is the minimum priority/rank number for the highest priority/rank.

Calculations can be simplified by using the high estimate of $|v_i|$ as:

$$|v_i| = \frac{\max_j(|CM_j| + 1)r_{\max}}{\min_{i,j}|a_{ij}|r_{\min}} = v \quad |a_{ij}| > .05 \quad i = 1, 2, \ldots, n \quad (23)$$

For the practical purposes, it is assumed that $|a_{ij}|>0.05$ to exclude extremely low process gains from the calculations. After computing the v penalty for all the process variables (e.g., CVs) that are out of the preset limits or out of the preset ranges, the penalties may be adjusted depending on priority of the process variable as:

$$|v_i| = v\left(1 - \frac{r_i - r_{\min}}{r_{\max}}\right) \quad (24)$$

After calculating the costs for the particular process variables that exceed their respective constraints according to equation (23), the total cost of all constraints for all manipulated variables maybe calculated from the equation (19). The procedure for calculating penalties should be applied sequentially for all the CVs that violate the constraints by applying equation (23) starting from the lowest priority violated constraint (greatest $r_i$) and working toward the highest priority violated constraint. For practical purposes, the effective penalty vector may be normalized. One possible normalization technique is to divide all of the vector components by a maximum component and to multiply by 100.

If desired, the concept of constraint handling can be extended to a situation that integrates the two approaches described above and, in particular, by combining the use of penalized slack variables and model redefinition. In this integrated approach, when there are no constraint violations or when the optimal solution calculated with penalized slack variables is acceptable, then only the penalized slack variables are used. However, when constraints are violated and the solution with penalized slack variables is not acceptable, then process output limits are redefined. In this case, the new output limits become equal to the predictions for the predicted process outputs violating limits as illustrated in FIG. 8. The original limit, however, is still used to define penalized slack variables as in the already described slack variable application.

Figure 9:
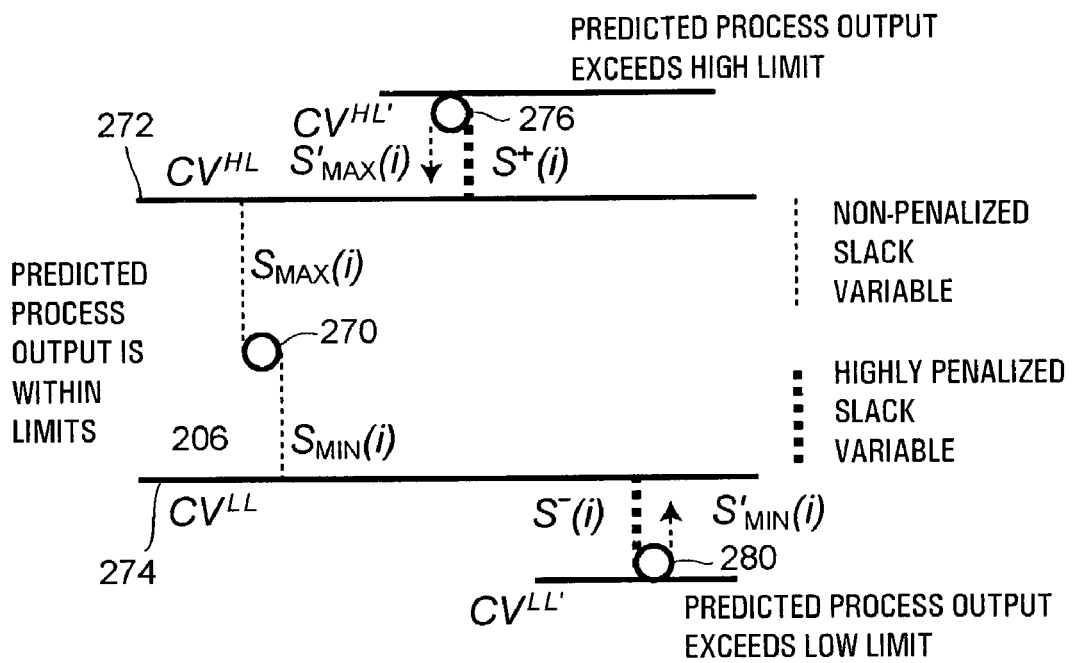
FIG. 9 is a graphical depiction illustrating the use of both slack variables and redefining a constraint model to perform optimization in the presence of one or more manipulated variables that are out of limits.

FIG. 9 illustrates this integrated use of slack variables and limit redefinition. In particular, a point 270 illustrates a predicted process variable or CV within the original limits $CV^{HL}$ and $CV^{LL}$ illustrated by the lines 272 and 274. A point 276 illustrates a predicted process variable or CV that violates the high limit $CV^{HL}$ 272. In this case, the limits are redefined as $CV^{HL'}$ and $CV^{LL'}$ as generally discussed above with respect to the limit redefinition of FIG. 8. Additionally, slack variables $S'_{max}$ and $S^+(i)$ are used to assess a penalty for the violation of the original limit using slack variable penalties as discussed above. In a similar manner, a point 280 illustrates a predicted process variable or CV that violates the low limit $CV^{LL}$ 274. In this case, the limits are redefined as $CV^{HL'}$ and $CV^{LL'}$ as generally discussed above with respect to the limit redefinition of FIG. 8. Additionally, slack variables $S'_{min}$ and $S^-(i)$ are used to assess a penalty for the violation of the original limit using slack variable penalties as discussed above.

This technique can be expressed using the following equations:

$$CV_{predicted} + A*\Delta MV(t+c) = CV^{LL} + S_{min} - S^- \quad (25)$$

$$CV_{predicted} + A*\Delta MV(t+c) = CV^{HL} - S_{max} + S^+ \quad (26)$$

$$CV_{predicted} + A*\Delta MV(t+C) = CV^{LL'} + S_{min}' \quad (27)$$

$$CV_{predicted} + A*\Delta MV(t+c) = CV^{HL'} - S_{max}' \quad (28)$$

Here, the redefined limit values $CV^{LL'}$ and $CV^{HL'}$ are low and high limits which can not be exceeded by the optimizer. The limit values are set as out of limit CV predictions or out of limit values with a wider range than the original limits. Integrated equations for the CV range control and two sided CV range control can be developed in a similar fashion. Additionally, integrated equations for single sided range control are identical to equations (25)-(28). Two sided range control may be implemented with the equation:

$$CV_{predicted} + A*\Delta MV(t+c) = SP - S_{below} + S_{above} \quad (29)$$

which is the same as equation (15).

As will be understood, this integrated approach allows constraint handling to be managed in a more flexible way. Currently inputs have only hard or fixed defined constraint limits. Using the same approach, it is possible to define soft constraints, contained within hard constraints, for some of the inputs. Introducing penalized slack variables for the soft constraints makes it easy to define a penalized range for the MV. Equations for these soft ranges can be expressed as:

$$MV_{min}^{soft} - S_{soft\,min}^- = MV_{current} + \Delta MV(t+c) \quad (30)$$

$$MV_{max}^{soft} - S_{soft\,max}^+ = MV_{current} + \Delta MV(t+c) \quad (31)$$

Figure 10:
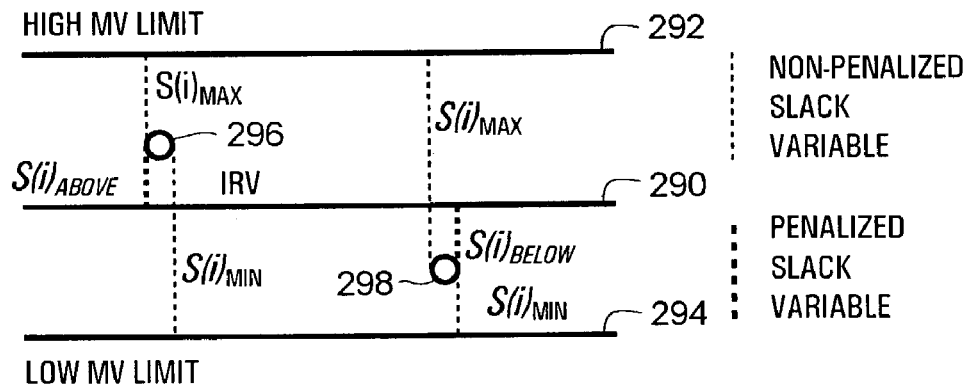
FIG. 10 is a graphical depiction illustrating the use of slack variables to optimize in the presence of an ideal resting value of a manipulated variable.

Finally the same approach may be used to cause the optimizer to drive a process variable such as a manipulated variable MV to a preferred input value, or the so-called "ideal resting value." This approach is illustrated in FIG. 10 in which the ideal resting value is illustrated by the line 290 with high and low MV limits illustrated by the lines 292 and 294, respectively. The points 296 and 298 illustrate the situation when the predicted value is above or below the ideal resting value 290. In these cases, the penalized slack variables $S(i)_{above}$ and $S(i)_{below}$ are used to define the cost or penalty within the objective function associated with deviating from the ideal resting value. Equations for an MV with the ideal resting value may be expressed as:

$$IRV - S_{below} + S_{above} = MV_{current} + \Delta MV(t+c) \quad (32)$$

$$MV_{min} + S_{min} = MV_{current} + \Delta MV(t+c) \quad (33)$$

$$MV_{max} - S_{max} = MV_{current} + \Delta MV(t+c) \quad (34)$$

As will be understood, the components of the penalized slack vectors $S^-$, $S^+$, $S_{below}$, $S_{above}$, e.g., the unit cost or penalty, may be set or selected in the objective function as a function of variable priorities, variable unit costs and/or other factors such as the degree of limit violation.

In tests using these techniques, limit violations were achieved by applying high level disturbances or by setting low and high limits on the inputs and outputs in a manner which caused these limits to be violated. These tests confirmed the usefulness of the techniques. In particular, during these tests, the optimizer acted properly and effectively to improve the high priority constraint violation with no further violation of lower priority constraints. Thus, handling infeasible LP solutions by applying slack variables and model redefinition is extremely flexible and effective approach.

Moreover, the principles of constraint handling discussed above can be used to develop a number of modifications of the constraint models to satisfy more specific requirements. Likewise, the approach may be used for other real time optimization applications without the use of MPC control, such as gasoline blending optimization. Still further, the optimizer 54 can use the techniques described above to implement range control, ideal resting values in situations in which one or more feasible solutions are possible. Thus, the optimizer 54 may use these techniques both in trying to optimize when using an objective function in situation in which no feasible solution can be found, or when using an objective function in situations in which one or more feasible solutions are possible, but it is desired to further optimize to an ideal resting value, within a set point range, etc.

Referring again to FIG. 2, after determining absolution for the set of manipulated variable targets, the optimizer 54 provides the set of optimal or target manipulated variables $MV_T$ to the target conversion block 55 which uses the steady state gain matrix to determine the target steady state control and manipulated variables that result from the target manipulated variables $MV_T$. This conversion is computationally straightforward, as the steady state gain matrix defines the interactions between the manipulated variables and the control and auxiliary variables and thereby can be used to uniquely determine the target manipulated and auxiliary variables $CV_T$ and $AV_T$ from the defined target (steady state) manipulated variables $MV_T$.

Once determined, at least of a subset of N of the target control and auxiliary variables $CV_T$ and $AV_T$ are provided as inputs to the MPC controller 52 which, as noted previously, uses these target values $CV_T$ and $AV_T$ to determine a new set of steady state manipulated variables (over the control horizon) $MV_{SS}$ which drives the current control and manipulated variables CV and AV to the target values $CV_T$ and $AV_T$ at the end of the control horizon. Of course, as is known, the MPC controller changes the manipulated variables in steps in an attempt to reach the steady state values for these variables $MV_{SS}$ which, theoretically, will be the target manipulated variables $MV_T$ determined by the optimizer 54. Because the optimizer 54 and MPC controller 52 operate as described above during each process scan, the target values of the manipulated variables $MV_T$ may change from scan to scan and as a result, the MPC controller may never actually reach any particular one of these sets of target manipulated variables $MV_T$, especially in the presence of noise, unexpected disturbances, changes in the process 50, etc. However, the optimizer 54 is always driving the controller 52 to move the manipulated variables MV towards an optimal solution.

As is known, the MPC controller 52 includes a control prediction process model 70, which may be an N by M+D step response matrix (where N is the number of control variables CV plus the number of auxiliary variables AV, M is the number of manipulated variables MV and D is the number of disturbance variables DV). The control prediction process model 70 produces on an output 72 a previously calculated prediction for each of the control and auxiliary variables CV and AV and a vector summer 74 subtracts these predicted values for the current time from the actual measured values of the control and auxiliary variables CV and AV to produce an error or correction vector on the input 76.

The control prediction process model 70 then uses the N by M+D step response matrix to predict a future control parameter for each of the control variables and auxiliary variables CV and AV over the control horizon based on the disturbance and manipulated variables provided to other inputs of the control prediction process model 70. The control prediction process model 70 also provides the predicted steady state values of the control variables and the auxiliary variables $CV_{SS}$ and $AV_{SS}$ to the input processing/filter block 58.

A control target block 80 determines a control target vector for each of the N target control and auxiliary variables $CV_T$ and $AV_T$ provided thereto by the target conversion block 55 using a trajectory filter 82 previously established for the block 38. In particular, the trajectory filter provides a unit vector defining the manner in which control and auxiliary variables are to be driven to their target values over time. The control target block 80 uses this unit vector and the target variables $CV_T$ and $AV_T$ to produce a dynamic control target vector for each of the control and auxiliary variables defining the changes in the target variables $CV_T$ and $AV_T$ over time period defined by the control horizon time. A vector summer 84 then subtracts the future control parameter vector for each of the control and auxiliary variables CV and AV from the dynamic control vectors to define an error vector for each of the control and auxiliary variables CV and AV. The future error vector for each of the control and auxiliary variables CV and AV is then provided to the MPC algorithm which operates to select the manipulated variable MV steps that minimize the, for example, least squared error, over the control horizon. Of course, the MPC algorithm or controller uses an M by M process model or control matrix developed from relationships between the N control and auxiliary variables input to the MPC controller 52 and the M manipulated variables output by the MPC controller 52.

More particularly, the MPC algorithm working with the optimizer has two main objectives. First, the MPC algorithm tries to minimize CV control error with minimal MV moves, within operational constraints and, second, tries to achieve optimal steady state MV values set up by optimizer and the target CV values calculated directly from the optimal steady state MV values.

To satisfy these objectives, the original unconstrained MPC algorithm can be extended to include MV targets into the least square solution. The objective function for this MPC controller is:

$$\min_{\Delta MV(k)} \{ \|\Gamma^y [CV(k) - R(k)]\|^2 + \tag{35}$$

$$\|\Gamma^u \Delta MV(k)\|^2 + \|\Gamma^o [\sum \Delta MV(k) - \Delta MVT]\|^2 \}$$

wherein:
CV(k) is the controlled output p-step ahead prediction vector;
R(k) is the p-step ahead reference trajectory (set point) vector;
ΔMV(k) is the c-step ahead incremental control moves vector;
$\Gamma^y = \text{diag}\{\Gamma_1^y, \ldots, \Gamma_p^y\}$ is a penalty matrix on the controlled output error;
$\Gamma^u = \text{diag}\{\Gamma_1^u, \ldots, \Gamma_c^u\}$ is a penalty matrix on the control moves;
p is the prediction horizon (number of steps);
c is the control horizon (number of steps); and
$\Gamma^o$ is a penalty on error of the sum of controller output moves over control horizon relative to the target optimal change of MV defined by the optimizer.

For the simplicity of notation, the objective function is shown for single-input/single-output (SISO) control.

As will be understood, the first two terms are the objective function for the unconstrained MPC controller while the third term sets up an additional condition that makes the sum of the controller output moves equal to the optimal targets. In other words, the first two terms set up objectives for controller dynamic operation while the third term sets up steady state optimization objectives.

It will be noted that the general solution for this controller, similar to that for the unconstrained MPC controller, can be expressed as:

$$\Delta MV(k) = (S^{uT} \Gamma^T \Gamma S^u + \Gamma^{uT} \Gamma^u)^{-1} S^{uT} \Gamma^T \Gamma E_{p+1}(k) = K_{ompc} E_{p+1}(k) \tag{36}$$

wherein:
ΔMV(k) is the change in MPC controller output at the time k;
$K_{ompc}$ is the optimized MPC controller gain; and
$S^u$ is the process dynamic matrix.
$S^u$ may be built from the step responses of dimension p×c for a SISO model and p*n×c*m for a multiple-input/multiple-output MIMO model with m manipulated inputs and n controlled outputs.

For optimized MPC, the dynamic matrix is extended to the size: (p+1)×m for SISO model and (p+m)*n×c*m for MIMO model, to accommodate the MV error. $E_{p+1}(k)$ is the CV error vector over the prediction horizon and error of the sum of controller output moves over control horizon relative to the target optimal change of MV. The matrix Γ combines the matrix $\Gamma^y$ and $\Gamma^o$ and is a square matrix of dimension (p+1) for a SISO controller and [n(p+m)] for the multivariable controller. Superscript T denotes a transposed matrix.

It has been determined that, because the optimizer 54 is optimizing based on all of the control and auxiliary variables CV and AV to determine a target set of manipulated variables $MV_T$ defining a unique optimal operating point, it does not matter that the MPC controller 52 is only operating using a subset of the control and auxiliary variables CV and AV in its control matrix to actually produce the manipulated variables MV output therefrom because, when the controller 52 drives the selected subset of control and auxiliary variables CV and AV to their associated targets, the others of the complete set of control and auxiliary variables will be at their target values as well. As a result, it has been determined that a square (M by M) MPC controller with an M by M control matrix can be used with an optimizer that uses a rectangular (N by M) process model to perform process optimization. This enables standard MPC control techniques to be used with standard optimization techniques without having to invert a non-square matrix with the attendant approximations and risks associated with such conversion techniques in a controller.

In one embodiment, when the MPC controller is squared, i.e., the number of manipulated variables MV is equal to the number of control variables CV, the manipulated variable MV target can be effectively achieved by changes in CV values as follows:

$$\Delta CV = A^* \Delta MVT \quad (37)$$

wherein:

$\Delta MVT$ is the optimal target change of MV; and $\Delta CV$ is the CV change to achieve optimal MV.

Of course, CV change is implemented by managing CV set points.

In operation, the optimizer 54 sets up and updates the steady state targets for the MPC unconstrained controller at every scan. Thus, the MPC controller 52 executes the unconstrained algorithm. Because the targets $CV_T$ and $AV_T$ are set in a manner that accounts for constraints, as long as a feasible solution exists, the controller works within constraint limits. Optimization, therefore, is an integral part of the MPC controller.

Figure 3:
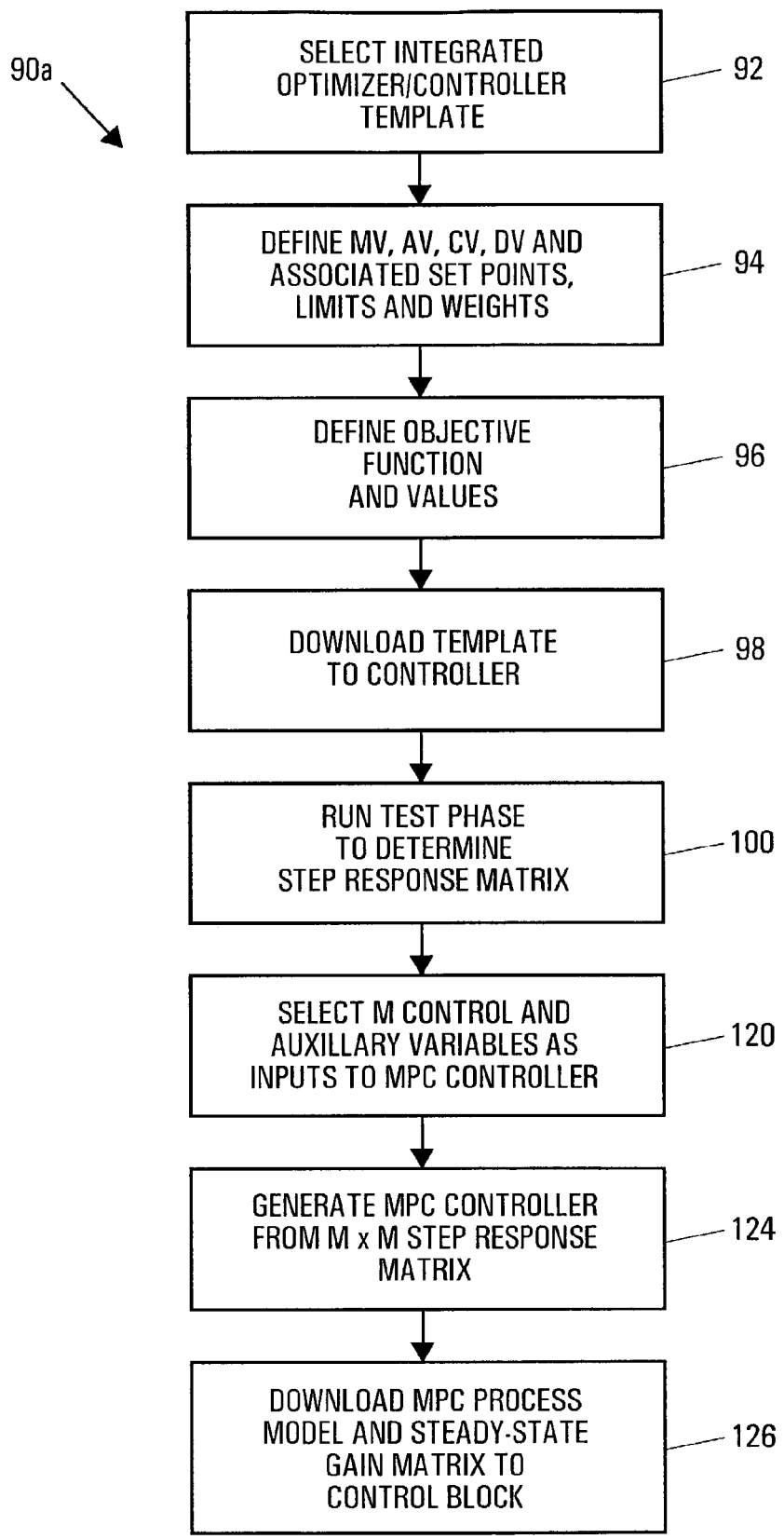
FIG. 3 is a flow chart illustrating a manner of creating and installing the integrated optimizer and MPC controller function block of FIG. 2.
Figure 4:
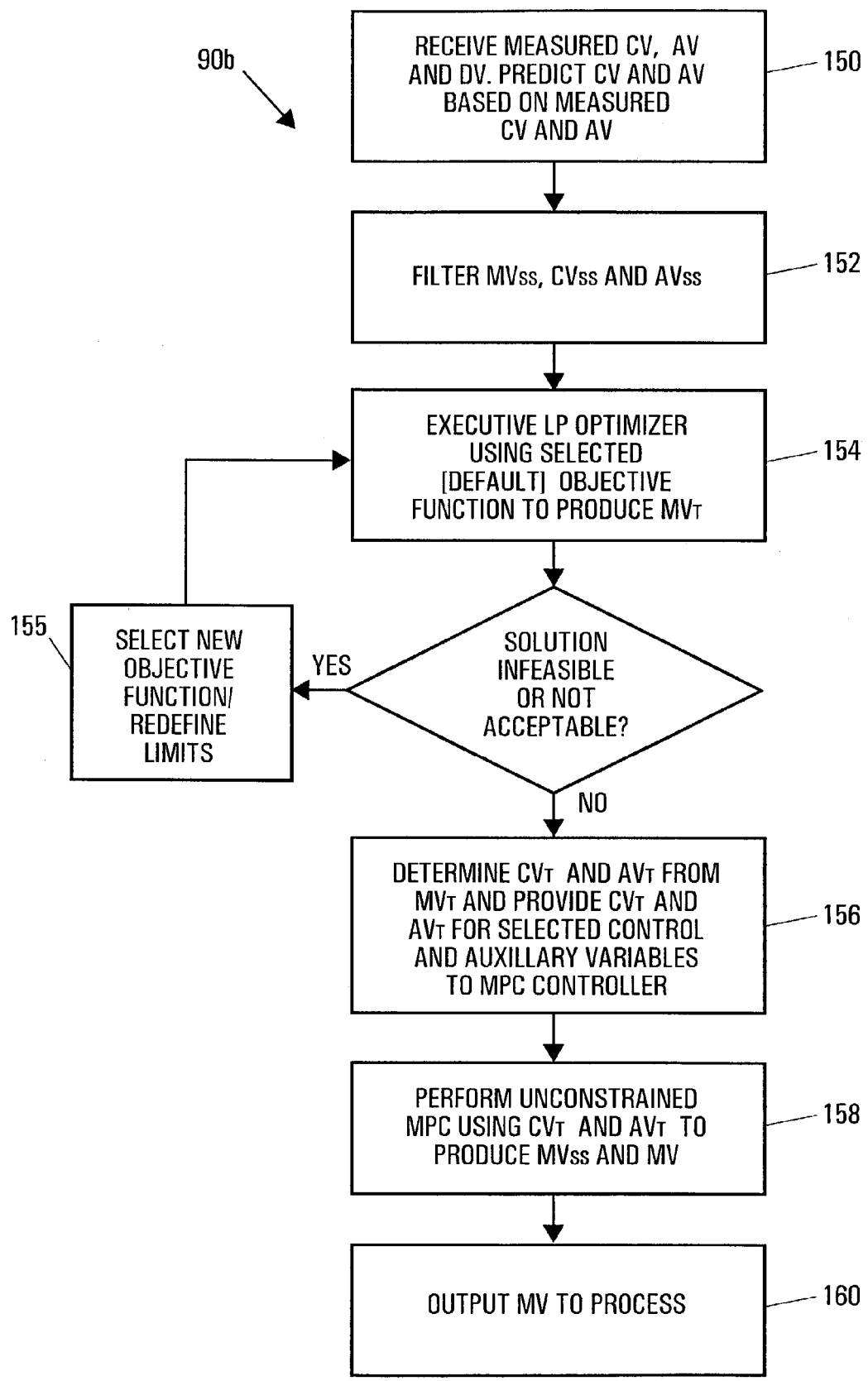
FIG. 4 is a flow chart illustrating the operation of the integrated optimizer and MPC controller of FIG. 2 during on-line process operation.

FIGS. 3 and 4 depict a flow chart 90 illustrating the steps used to perform integrated model predictive control and optimization. The flow chart 90 is generally divided into two sections 90a (FIG. 3) and 90b (FIG. 4) illustrating functions which occur prior to process operation (90a) and functions which occur during process operation (90b), e.g., during every scan of process operation. Prior to process operation, an operator or engineer takes a number of steps to create the advanced control block 38 including an integrated MPC controller and optimizer. In particular, at a block 92, an advanced control template may be selected for use as the advanced control block 38. The template may be stored in and copied from a library within a configuration application on the user interface 13 and may include the general mathematics and logic functions of the MPC controller routine 52 and optimizer 54 without the particular MPC, process models and steady state gain or control matrices and the particular objective function. This advanced control template may be placed in a module having other blocks, such as input and output blocks configured to communicate with devices within the process 50, as well as other types of function blocks, such as control blocks, including PID, neural network and fuzzy logic control blocks. It will be understood that, in one embodiment, each of the blocks within a module is an object within an object oriented programming-paradigm having inputs and outputs thereof connected to each other to perform communications between the blocks. During operation, the processor running the module executes each of the blocks in sequence at a different time using the inputs to the blocks to produce the outputs of the blocks which are then provided to the inputs of other blocks as defined by the specified communication links between the blocks.

At a block 94, the operator defines the particular manipulated variables, control variables, constrained variables and disturbance variables to be used in the block 38. If desired, in a configuration program, such as the program 40 of FIG. 1, the user may view the control template, select inputs and outputs to be named and configured, browse using any standard browser within the configuration environment to find the actual inputs and outputs within the control system and select these actual control variables as the input and output control variables for the control template.

After selecting the inputs and outputs to the advanced control function block, the user may define the set points associated with the control variables, the ranges or limits associated with the control variables, the auxiliary variables, and the manipulated variables, and the weights associated with each of the control, auxiliary and manipulated variables. Of course, some of this information, such as constraint limits or ranges may already be associated with these variables as these variables are selected or found within the process control system configuration environment. If desired, at a block 96 of FIG. 3, the operator may configure the one or more objective functions to be used within the optimizer by specifying the unit costs and/or profits for each of the manipulated variables, the control variables and the auxiliary variables. Of course, at this point, the operator may select to use the default objective function as described above. Still further, the user may specify the costs or penalties associated with each of the slack variables or penalty variables $S^+$, $S^-$, $S_{above}$, $S_{below}$, etc. for each of the control, auxiliary and manipulated variables. If desired, the user may specify the particular manner in which the optimizer will handle or deal with infeasible solutions as defined by the original constraint limits, such as using slack variables, redefining constraint limits or some combination of the two.

After the inputs (control, auxiliary and disturbance variables) and outputs (manipulated variables) are named and tied to the advanced control template and the weights, limits and set points are associated therewith, at a block 98 of FIG. 3, the advanced control template is downloaded into a selected controller within the process as a function block to be used for control. The general nature of the control block, and the manner of configuring this control block is described in U.S. Pat. No. 6,445,963, entitled "Integrated Advanced Control Blocks in Process Control Systems," which is assigned to the assignee hereof and which is hereby expressly incorporated by reference herein. While this patent describes the nature of creating an MPC controller within a process control system and does not discuss the manner in which an optimizer can be connected to that controller, it will be understood that the general steps taken to connect and configure the controller can be used for the control block 38 described herein with the template including all of the logic elements discussed herein for the control block 38 instead of just those described in the referenced patent.

In any event, after the advanced control template is downloaded into the controller, the operator may, at a block 100, select to run a test phase of the control template to generate the step response matrix and the process model to be used within the MPC controller algorithm. As described in the patent identified above, during the test phase, control logic within the advanced control block 38 provides a series of pseudo-random waveforms to the process as the manipulated variables and observes the changes in the control and auxiliary variables (which are treated by the MPC controller essentially as control variables). If desired, the manipulated and disturbance variables, as well as the control and auxiliary variables may be collected by the historian 12 of FIG. 1 and the operator may set up the configuration program 40 (FIG. 1) to obtain this data from the historian 12 and to perform trending on this data in any manner to obtain or determine the matrix of step responses, each step response identifying the response in time of one of the control or auxiliary variables to a unit change in one (and only one) of the manipulated and control variables. This unit change is generally a step change, but could be another type of change such as an impulse or ramped change. On the other hand, if desired, the control block 38 may generate the step response matrix in response to the data collected when applying the pseudo-random waveforms to the process 50 and then provide these waveforms to the operator interface 13 being used by the operator or user creating and installing the advanced control block 38.

After the step response matrix is created, in the case in which the control and auxiliary variables outnumber the manipulated variables, the step response matrix is used to select the subset of control and auxiliary variables that will be used within the MPC algorithm as the M by M process model or control matrix to be inverted and used within the MPC controller 52. This selection process may be performed manually by the operator or automatically by a routine within, for example, the user interface 13 having access to the step response matrix. Generally speaking, a single one of the control and auxiliary variables will be identified as being the most closely related to a single one of the manipulated variables. Thus, a single and unique (i.e., different) one of the control or auxiliary variables (which are inputs to the process controller) will be associated with each of the different manipulated variables (which are the outputs of the process controller) so that the MPC algorithm can be based on a process model created from an M by M set of step responses.

In one embodiment which uses a heuristic approach in providing pairing, the automatic routine or the operator will select the set of M (where M equals the number of manipulated variables) control and auxiliary variables in an attempt to select the single control or auxiliary variable that has some combination of the largest gain and fastest response time to a unit change in a particular one of the manipulated variables and pair these two variables. Of course, in some cases, a particular control or auxiliary variable may have a large gain and fast response time to multiple manipulated variables. Here, that control or auxiliary variable may be paired with any of the associated manipulated variables and may, in fact, be paired with a manipulated variable that does not produce the largest gain and fastest response time because, in the aggregate, the manipulated variable that causes the lesser gain or slower response time may not effect any other control or auxiliary variable to an acceptable degree. Thus, the pairs of manipulated variables on the one hand and the control or auxiliary variables on the other hand are chosen to, in an overall sense, pair the manipulated variables with the subset of control and auxiliary variables that represent the most responsive control variables to the manipulated variables. Still further, it doesn't matter if all of the control variables are not selected as one of the subset of M control and auxiliary variables and that, therefore, the MPC controller does not receive all of the control variables as inputs thereto, because the set of control and auxiliary variable targets are chosen by the optimizer to represent an operating point of the process at which the non-chosen control (as well as the non-chosen auxiliary) variables are at their set point or within their provided range of operation.

Of course, because there may be tens and even hundreds of control and auxiliary variables on the one hand and tens or hundreds of manipulated variables on the other hand, it can be difficult to select the set of control variables and auxiliary variables that have the best response to each of the different manipulated variables, at least from a visualization standpoint. To overcome this problem, the advanced control block generation routine 40 within the operator interface 13 may include or present a set of screen displays to the user or operator to help or enable the operator to make appropriate selections of the control and auxiliary variables that should be used as the subset of control and auxiliary variables to be used in the MPC controller 52 during operation.

Thus, at a block 120 illustrated in FIG. 3, the operator may be presented with a screen in which the operator can view the response of each of the control and auxiliary variables to a particular or selected one of the manipulated variables. The operator may scroll through the manipulated variables, one at a time, and view the step responses of each of the control and auxiliary variables to each of the different manipulated variables and, during the process, select the one control or auxiliary variable that is best responsive to that manipulated variable. Typically, the operator will try to choose the control or manipulated variable that has the best combination of the highest steady state gain and the fastest response time to the manipulated variable.

As will be understood, such display screens enable the operator to visualize and select the subset of M control and auxiliary variables that will be used as inputs the MPC control algorithm which is especially useful when there are numerous ones of these variables. Of course, the set of control and constraint variables determined at the block 74 may be selected automatically or electronically based on some pre-established criteria or selection routine which may choose the input variables to use based on some combination of gain response and time delay as determined from the step responses for the control variables and the manipulated variables.

In another embodiment, an automatic selection process may first determine a control matrix by selecting an input/output matrix based on the condition number of the matrix, e.g., by minimizing the condition number to some desired extent, and by then developing a controller configuration from the control matrix.

In this example, for a process gain matrix, A, the condition number of the matrix $A^T A$ may be determined to test the matrix controllability. A smaller condition number generally means better controllability while a higher condition number means less controllability and more control steps or moves during dynamic control operation. There are no strict criteria for defining an acceptable degree of controllability and, therefore, the condition number can be used as a relative comparison of various potential control matrices and as a test for ill conditioned matrices. As is known, a condition number for an ill conditioned matrix approaches infinity. Mathematically, ill conditioning occurs in the case of co-linear process variables—that is, due to co-linear rows or columns in the control matrix. Thus, a major factor that affects the condition number and controllability is cross-correlation between matrix rows and columns. Careful selection of the input-output variables in the control matrix can reduce conditioning problems. Practically, there should be a concern if the condition number of a control matrix is in the hundreds (e.g., 500) or higher. With such a matrix, controller manipulated variable moves are highly excessive.

As discussed above, the control matrix solves the dynamic control problem, while the LP optimizer solves the steady state optimization problem and the control matrix needs to be a square input-output matrix even though MPC controller block may have an unequal number of MVs (including AVs) and CVs. To begin selecting the inputs and output for the control matrix for use in generating the controller, all the available MVs are typically; included-or selected as controller outputs. After selecting the outputs (the MVs), the process output variables (i.e., the CVs and AVs) that are made part of the dynamic control matrix must be selected in such a manner to produce a square control matrix that is not ill conditioned.

One method of automatically or manually selecting the CVs and AVs as inputs within the control matrix will now be discussed, it being understood that other methods may be used as well.

Step 1—CVs are selected until, if possible, the number of CVs equals the number of MVs (i.e., the number of controller outputs). In the case in which there are more CVs than MVs, the CVs may be chosen in any order based on any desired criteria, such as the priority, gain or phase responses, user input, etc. If the total possible number of CVs is equal to the number of MVs then proceed to Step 4 to test the resulting square control matrix condition number for acceptability. If the number of CVs is less than the number of MVs, AVs may be selected as described in Step 2. If there are no CVs defined, select the AV with maximum gain relative to an MV and go to Step 2.

Step 2—Calculate one by one, the condition number for every possible AV added to already selected control matrix defined by the previously selected CVs and AVs. As will be understood, the matrix defined by the selected CVs will include a row for each selected CV and AV, defining the steady state gain for that CV or AV to each of the previously selected MVs.

Step 3—Select the AV determined in Step 2 that results in the minimum condition number for the resulting matrix and define the matrix as the previous matrix with the addition of the selected AV. If number of MVs now equals the number of selected CVs plus the number of selected AVs (that is, if the matrix is now square) go to Step 4. Otherwise return to Step 2.

Step 4—Calculate the condition number for the created square control matrix $A_c$. If desired, the condition number calculation for the matrix $A_c$ instead of the matrix $A_c^T A_c$ may be used, as the condition numbers for these different matrices are related as the squared root of the other.

Step 5—If the condition number calculated at Step 4 is acceptable, associate every CV and selected AV with an MV, by selecting the CV or AV having the maximum gain relative to a specific MV until the pairing is complete. At this point the selection process is complete. If, on the other hand, the condition number is greater than the minimum acceptable condition number, remove the last AV/CV added to the control matrix and perform the wrap-around procedure of Step 6.

Step 6—Perform a wrap-around procedure for each of the selected MVs, one at a time and calculate the condition number of the matrix that results from each wrap-around procedure. Essentially, a wrap-around procedure is performed by placing, in turn, a unity response for each of the different MVs in place of removed AV (or CV). The unity response will be unity at one of the positions in the row of the matrix and zero everywhere else. In essence, each the particular MVs is being used as an input and an output in this case instead of the AV to form a well conditioned square control matrix. As an example, for a four by four matrix, the combinations 1000, 0100, 0010, and 0001 will be placed in the row of the removed AV line in the gain matrix, $A_c$.

Step 7—After performing a wrap around procedure for each of the MVs, select the combination that results in the minimum condition number. If there is no improvement, keep the original matrix). At this point, associate every selected CV and selected AV with an MV, by selecting the CV or AV with maximum gain relative to a specific MV, excluding the MV that is used for controlling itself (i.e., the MV that was wrapped-around).

Of course, the control matrix defined by this procedure as well as the resulting condition number may be submitted to the user and the user can accept or reject the defined control matrix for use in generating the controller.

It should be noted that, in the automatic procedure described above, at most only one MV was selected for controlling itself (i.e., wrapped-around) for the purpose of improving controllability. In the manual procedure, the number of wrapped-around MVs can be arbitrary. The MVs selected for controlling themselves are evident by the absence of a corresponding output variable selection in the controller configuration. Also, one can use more MVs as wrap-arounds for control if the number of MVs is greater than the number of total CVs plus AVs. In this way, at the end, a square control matrix is still provided to the controller having each of the MVs as outputs. It will be understood that the process of performing and using wrap-arounds means that the number of CVs and AVs selected for the control matrix can be less than the-number of MVs controlled by the controller, with the difference being the number of MVs wrap-around as inputs the control matrix. Further, this wrap-around procedure can be used in a process that has less CVs plus AVs than MVs.

Of course, the condition number is calculated above using the steady state gains and, therefore, the control matrix defines controllability essentially for steady state. Process dynamics (dead time, lag, etc.) and model uncertainty also have an effect on dynamic controllability and these effects can be taken into account by changing the priority of process variables (e.g., control and auxiliary variables), which may dictate their inclusion in the control matrix due to the effects they have on dynamic control.

It is also possible to use other heuristic procedures intended to improve both steady state and dynamic controllability. Such a procedure would typically have number of heuristic criteria, possibly some that are contradictory, that are applied in several phases to develop a control matrix and, thereby select an appropriate set of controller inputs, that provide some improvements of the control matrix. In one such heuristic procedure, the CVs and the AVs will be grouped by MV based on the highest gain relationship. Then, for each MV grouping, the one process output with fastest dynamics and significant gain will be selected. This selection process may consider confidence interval and give preference to CVs over AVs (with all else equal). The process model generation routine will then use the parameter selected from each group during the MPC control generation. Because only one parameter is selected for each MV, the response matrix is square and can be inverted.

In any event, after choosing the subset of M (or less) control and auxiliary variable inputs to the MPC controller, a block 124 of FIG. 3 generates the process model or controller to be used in the MPC control algorithm 86 of FIG. 2 from the determined square control matrix. As is known, this controller generation step is a computationally intensive procedure. A block 126 then downloads this MPC process model (inherently including the control matrix) or controller and, if need be, the step responses and the steady state step response gain matrix to the control block 38 and this data is incorporated into the control block 38 for operation. At this time, the control block 38 is ready for on-line operation within the process 50.

If desired, the process step responses may be reconfigured or provided in a manner other than the generation of these step responses. For example, the step responses may be copied from different models stored in the system to specify the step response of a certain control or auxiliary variable to a manipulated or disturbance variable. Additionally, a user may define or specify the parameters for a step response, such as the steady state gain; the response time, the first order time constant and the squared error and, if desired, the user may view and change the properties of a step response by specifying different parameters, such as a different gain or time constant if so desired. If the user specifies a different gain or other parameter, the step response model can be mathematically regenerated to have this new parameter or set of parameters. This operation is useful when the user knows the parameters of the step response and needs to change the generated step response to match or meet these parameters.

Referring now to FIG. 4, the general steps performed during each operation cycle or scan of the advanced control block 38, as created using the flow chart 90a of FIG. 3, while the process 50 is operating on line are illustrated. At a block 150, the MPC controller 52 (FIG. 2) receives and processes the measured values of the control and auxiliary variables CV and AV. In particular, the control prediction process model processes the CV, AV and DV measurements or inputs to produce the future control parameter vector, as well as the predicted steady state control and auxiliary variables $CV_{SS}$ and $AV_{SS}$.

Next, at a block 152, the input processing/filter block 58 (FIG. 2) processes or filters the predicted control and auxiliary and manipulated variables $CV_{SS}$, $AV_{SS}$ and $MV_{SS}$ developed by the MPC controller 52 and provides these filtered values to the optimizer 54. At a block 154, the optimizer 54 executes standard LP techniques to determine the set of M manipulated variable targets $MV_T$ which maximize or minimize the selected or default objective function while not violating any of the limits of the auxiliary and manipulated variables and while keeping the control variables at their specified set point or within the specified ranges for these variables. Generally speaking, the optimizer 54 will calculate a target manipulated variable solution $MV_T$ by forcing each of the control variables and the auxiliary variables to their limits. As noted above, in many cases, a solution will exist in which each of the control variables are at their set point (which may initially be treated as an upper limit on the control variable) while each of the auxiliary variables remain within their respective constraint limits. If this is the case, then the optimizer 54 need only output the determined manipulated variable targets $MV_T$ that produce an optimal result for the objective function.

In some cases, however, due to tight constraints on some or all of the auxiliary or manipulated variables, it may be impossible to find an operating point at which all of the control variables are at their set point and all of the auxiliary variables are within their respective constraint limits because such a solution does not exist. In these cases, as illustrated by the block 155, the optimizer 54 develops a new objective function and/or selects a new set of limits using the slack variable and/or limit redefinition techniques described above. The block 154 then reruns the optimizer 54 with the newly developed objective function and/or limits with or without penalty variables to determine an optimal solution. If no feasible solution, or if an otherwise unacceptable solution is still found, the block 155 may operate again to define a new set of limits or a new objective function to be used in a further pass of the optimizer 54. For example, in a first pass with an infeasible solution, the block 155 may select to use slack variables and thereby provide a new objective function for use in the second pass of the optimizer 54. If an infeasible or otherwise unacceptable solution is found after the second pass, the block 155 may redefine the constraint limits, either with or without penalty variables and provide these new constraint limits and possibly a new objective function to the block 154 for use in a third pass. Of course, the block 155 may use a combination of slack variables and limit redefinitions and provide a new objective function and limits for use in any pass of the optimizer 54. The block 155 can of course use any other desired strategy for selecting a new objective function or redefining constraint limits in the situation in which no feasible solution is found using the original objective function. If desired, the original objective function run in the block 154 may include slack variable penalties that may be used to drive the process variables to a limit, a set point, or an ideal resting value during the first pass (or any subsequent pass) of the optimizer. Additionally, the original objective function used in the block 154 may include the slack variable constraint handling in the first place and this may be used on the first pass of the optimizer. Then, in subsequent runs, if they are needed, limit redefinition may be used, either alone or in conjunction with penalized slack variables. Likewise, one or both of slack variables and limit redefinition may be used to drive process variables to limits, to a set point, to an ideal resting value, etc. using any of the techniques described above during any subsequent pass of the optimizer.

In any event, after the block 154 finds a feasible or acceptable solution, a block 156, using the target conversion block 55 (FIG. 2) uses the steady state step response gain matrix to determine the target values of the control and auxiliary variables $CV_T$ and $AV_T$ from the target values for the manipulated variables $MV_T$ and provides the selected N (where N is equal to or less than M) subset of these values to the MPC controller 52 as target inputs. At a block 158, the MPC controller 52 uses the control matrix or logic derived therefrom to operate as an unconstrained MPC controller as described above to determine the future CV and AV vector for these target values, performs vector subtraction with the future control parameter vector to produce the future error vector. The MPC algorithm operates in a known manner to determine steady state manipulated variable $MV_{SS}$ based on the process model developed from the M by M step responses and provides these $MV_{SS}$ values to the input processing/filter block 58 (FIG. 2). At a block 160, the MPC algorithm also determines the; MV steps to be output to the process 50 and outputs the first of these steps to the process 50 in any appropriate manner.

During operation, one or more monitoring applications run in, for example, one of the interfaces 13 may subscribe to information from the advanced control block or other function blocks communicatively connected thereto, either directly or through the historian 12, and provide one or more viewing or diagnostics screen to the user or operator for viewing the operational state of the advanced control block. Function block technology features cascade inputs (CA- S_IN) and remote cascade inputs (RCAS_IN) as well as corresponding back calculation outputs (BKCAL_OUT and RCAS_OUT) on both control and output function blocks. It is possible, using these connectors, to attach a supervisory optimized MPC control strategy on top of the existing control strategy and this supervised control strategy may be viewed using one or more viewing screens or displays. Likewise, targets for the optimized MPC controller can be modified from a strategy as well, if so desired.

While the advanced function block has been illustrated herein as having an optimizer located within the same function block and therefore executed in the same device as the MPC controller, it is also possible to implement the optimizer in a separate device. In particular, the optimizer may be located in a different device, such as in one of the user workstations 13 and may communicate with the MPC controller as described in conjunction with FIG. 2 during each execution or scan of the controller to calculate and provide the target manipulated variables ($MV_T$) or the subset of the control and auxiliary variables (CV and AV) determined therefrom to the MPC controller. Of course, a special interface, such as a known OPC interface, may be used to provide the communication interface between the controller or the function block having the MPC controller therein and the workstation or other computer that implements or executes the optimizer. As in the embodiment described with respect to FIG. 2, the optimizer and MPC controller must still communicate with each other during each scan cycle to perform integrated optimized MPC control.

Of course, other desired types of optimizers may use the infeasibility handling techniques described herein, such as known or standard real time optimizers that may already exist within a process control environment. This feature may also be used advantageously if the optimization problem is non-linear and the solution requires non-linear programming techniques. Still further, while the optimizer 54 has been described as being used to develop target variables for an MPC routine, the optimizer 54 may use the infeasibility handling techniques described herein to produce target values or other variables for use by other types of controllers, such as PID controllers, fuzzy logic controllers, etc.

While the advanced control block and other blocks and routines described herein have been described herein as being used in conjunction with Fieldbus and standard 4-20 ma devices, they can, of course, be implemented using any other process control communication protocol or programming environment and may be used with any other types of devices, function blocks or controllers. Although the advanced control blocks and the associated generation and testing routines described herein are preferably implemented in software, they may be implemented in hardware, firmware, etc., and may be executed by any other processor associated with a process control system. Thus, the routine 40 described herein may be implemented in a standard multi-purpose CPU or on specifically designed hardware or firmware such as, for example, ASICs, if so desired. When implemented in software, the software may be stored in any computer readable memory such as on a magnetic disk, a laser disk, an optical disk, or other storage medium, in a RAM or ROM of a computer or processor, etc. Likewise, this software may be delivered to a user or to a process control system via any known or desired delivery method including, for example, on a computer readable disk or other transportable computer storage mechanism or modulated over a communication channel such as a telephone line, the internet, etc. (which is viewed as being the same as or interchangeable with providing such software via a transportable storage medium).

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A method of controlling a process, comprising:
    running an optimizer that uses an objective function to develop a solution defining a set of target values;
    determining if the solution is feasible with respect to a set of process variable constraints;
    if the solution is not feasible;
        (1) redefining the process variable constraints for at least one process variable to define a new upper and lower process variable constraint limit for the one process variable;
        (2) developing a new objective function by adding a penalty variable to the objective function for the one process variable, wherein the penalty variable penalizes the objective function based on the amount by which the one process variable differs from one of the new process variable constraint limits for the one process variable; and
        (3) rerunning the optimizer with the new objective function to develop a new solution defining a new set of target values with the new process variable constraint limits for the one process variable;
    providing the target values or the new target values to a controller; and
    running the controller using the target values or the new target values to develop a set of control signals for controlling the process.

2. The method of claim 1, further including providing a set of slack variables in the objective function to define a penalty for at least one of the process variables based on the amount by which the at least one of the process variables violates an associated constraint.

3. The method of claim 2, including setting a unit penalty associated with the set of slack variables larger than unit cost variables within the objective function defining one or more economic costs.

4. The method of claim 1, further including providing a set of slack variables in the objective function to define a penalty for at least one of the process variables based on the amount by which the at least one of the process variables differs from an ideal resting value.

5. The method of claim 4, including setting a unit penalty associated with the set of slack variables larger than unit cost variables within the objective function defining one or more economic costs.

6. The method of claim 1, further including providing a set of slack variables in the objective function to define a penalty for at least one of the process variables based on the amount by which the at least one of the process variables differs from a set point.

7. The method of claim 6, including setting a unit penalty associated with the set of slack variables larger than unit cost variables within the objective function defining one or more economic costs.

8. The method of claim 1, including providing a unit penalty for the penalty variable that is larger than one or more unit cost variables defining one or more economic costs within the objective function.

9. The method of claim 1, including providing a unit penalty for the penalty variable that is larger than all unit cost variables defining economic costs within the objective function.

10. The method of claim 1, wherein running the controller includes running a multiple-input, multiple-output controller.

11. The method of claim 10, wherein running the multiple-input, multiple-output controller includes running a model predictive control type controller.

12. A system adapted to be implemented with a processor for use in controlling a process, comprising:
   a computer readable medium
   an optimizer routine stored on the computer readable medium and executable on the processor to use an objective function to develop a solution defining a set of target values;
   a feasibility handling routine stored on the computer readable medium and executable on the processor to determine if the solution is feasible with respect to a set of process variable constraints and if the solution is not feasible;
      to redefine the process variable constraints for at least one process variable to define a new upper and lower process variable constraint limit for the one process variable;
      to develop a new objective function by adding a penalty variable for the one process variable to the objective function, wherein the penalty variable penalizes the objective function based on the amount by which the one process variable differs from one of the new process variable constraint limits for the one process variable; and
      to rerun the optimizer routine with the new objective function to develop a new solution defining a new set of target values with the new process variable constraint limits for the one process variable; and
   a controller that receives the target values or the new target values and uses the target values or the new target values to develop a set of control signals to control the process.

13. The system of claim 12, wherein the objective function includes a set of slack variables that define a penalty for at least one of the process variables based on the amount by which the at least one of the process variables violates an associated constraint.

14. The system of claim 13, wherein the objective function includes a unit penalty associated with the set of slack variables that is larger than unit cost variables within the objective function defining one or more economic costs.

15. The system of claim 12, wherein the objective function includes a set of slack variables that define a penalty for at least one of the process variables based on the amount by which the at least one of the process variables differs from an ideal resting value.

16. The system of claim 15, wherein the objective function includes a unit penalty associated with the set of slack variables that is larger than unit cost variables within the objective function defining one or more economic costs.

17. The system of claim 12, wherein the objective function includes a set of slack variables that define a penalty for at least one of the process variables based on the amount by which the at least one of the process variables differs from a set point.

18. The system of claim 17, wherein the objective function includes a unit penalty associated with the set of slack variables that is larger than unit cost variables within the objective function defining one or more economic costs.

19. The system of claim 12, wherein the objective function includes a unit penalty for the penalty variable that is larger than one or more unit cost variables defining one or more economic costs within the objective function.

20. The system of claim 12, wherein the objective function includes a unit penalty for the penalty variable that is larger than all unit cost variables defining an economic cost within the objective function.

21. The system of claim 12, wherein the controller includes a multiple-input, multiple-output controller routine.

22. The system of claim 21, wherein the multiple-input, multiple-output controller routine includes a model predictive control type controller.

23. A method of controlling a process, comprising:
   defining at least one constraint associated with each of a set of process variables;
   defining an objective function to include one or more economic unit costs associated with the process variables and a penalty variable associated with one of the process variables violating the constraint for the one of the process variables, wherein the penalty variable has a unit penalty that is greater than each of the economic unit costs;
   using the objective function to develop a set of process control signals for use in controlling the process; and
   using the set of process control signals to control the process.

24. The method of claim 23, wherein defining the at least one constraint includes defining a set of range limits associated with the one of the process variables.

25. The method of claim 23, wherein defining the at least one constraint includes defining a set point associated with the one of the process variables.

26. The method of claim 23, wherein defining the at least one constraint includes defining an ideal resting value associated with the one of the process variables.

27. The method of claim 23, wherein defining the at least one constraint includes defining a first set of range limits associated with the one of the process variables and a second set of range limits associated with the one of the process variables and wherein defining an objective function includes defining a first penalty variable associated with violating the first set of range limits and a second penalty variable associated with violating the second set of range limits, wherein a first unit penalty associated with the first penalty variable is less than a second unit penalty associated with the second penalty variable.

28. The method of claim 23, wherein defining the at least one constraint includes defining a first value associated with the one of the process variables and a set of range limits associated with the one of the process variables and wherein defining an objective function includes defining a first penalty variable associated with the one of the process variables differing from the first value and a second penalty variable associated with the one of the process variables violating the set of range limits, wherein a first unit penalty associated with the first penalty variable is less than a second unit penalty associated with the second penalty variable.

29. The method of claim 28, wherein the first value is a set point.

30. The method of claim 28, wherein the first value is an ideal resting value.

31. The method of claim 23, including using the objective function to develop an optimal set of control signals over a time horizon during which one of the process variables is estimated to violate the constraint for that process variable.

32. The method of claim 23, including detecting when the one of the process variables is expected to violate the constraint associated with the one of the process variables and redefining the constraint for the one of the process variables, redefining the objective function and using the redefined objective function to determine the set of process control signals when the one of the process variables is expected to violate the constraint associated with the one of the process variables.

33. The method of claim 32, wherein redefining the objective function includes adding a further penalty variable to the objective function for the one of the process variables, wherein the further penalty variable penalizes the objective function based on the amount by which the one of the process variables differs from the redefined constraint for the one of the process variables.

34. The method of claim 33, wherein adding the further penalty variable includes setting a further unit penalty associated with the further penalty variable larger than the economic unit costs within the objective function defining one or more economic costs.

35. The method of claim 33, wherein adding the further penalty variable includes setting a further unit penalty associated with the further penalty larger than the unit penalty associated with the penalty variable within the objective function.

36. The method of claim 33, wherein adding the further penalty variable includes setting a further unit penalty associated with the further penalty larger than the unit penalty associated with the penalty variable within the objective function.

37. A system for use with a processor to control a process, comprising:
a computer readable medium;
a first routine stored on the computer readable medium and executable on the processor to store at least one constraint associated with each of a set of process variables;
a second routine stored on the computer readable medium and executable on the processor to store an objective function that defines one or more economic unit costs associated with the process variables and a penalty variable associated with at least one of the process variables violating the constraint for the one of the process variables, wherein the penalty variable has a unit penalty that is greater than the economic unit costs; and
a third routine stored on the computer readable medium and executable on the processor to use the objective function to develop a set of process control signals and to use the set of process control signals to control the process.

38. The system of claim 37, wherein the at least one constraint for the one of the process variables includes a set of range limits associated with one of the process variables.

39. The system of claim 37, wherein the at least one constraint for the one of the process variables includes a set point associated with one of the process variables.

40. The system of claim 37, wherein the at least one constraint for the one of the process variables includes an ideal resting value associated with one of the process variables.

41. The system of claim 37, wherein the at least one constraint for the one of the process variables includes a first set of range limits associated with one of the process variables and a second set of range limits associated with the one of the process variables and wherein the objective function includes a first penalty variable associated with the first set of range limits and a second penalty variable associated with the second set of range limits, wherein a first unit penalty associated with the first penalty variable is less than a second unit penalty associated with the second penalty variable.

42. The system of claim 37, wherein the at least one constraint for the one of the process variables includes a first value associated with the one of the process variables and a set of range limits associated with the one of the process variables and wherein the objective function includes a first penalty variable associated with the one of the process variables differing from the first value and a second penalty variable associated with the one of the process variables violating the set of range limits, wherein a first unit penalty associated with the first penalty variable is less than a second unit penalty associated with the second penalty variable.

43. The system of claim 42, wherein the first value is a set point.

44. The system of claim 42, wherein the first value is an ideal resting value.

45. The system of claim 37, wherein the third routine is executable use the objective function to develop an optimal set of process control signals over a time horizon in which the one of the process variables is estimated to violate the constraint for the one of the process variables.

46. The system of claim 37, including a fourth routine stored on the computer readable medium and executable on the processor to detect when one of the process variables is expected to violate the constraint associated with the one of the process variables and to redefine the constraint for the one of the process variables, to redefine the objective function and to cause the third routine to use the redefined objective function to determine the set of process control signals when the one of the process variables is expected to violate the constraint associated with the one of the process variables.

47. The system of claim 46, wherein the fourth routine is executable to redefine the objective function by adding a further penalty variable to the objective function for the one of the process variables, wherein the further penalty variable penalizes the objective function based on the amount by which the one of the process variables differs from the redefined constraint for the one of the process variables.

48. The system of claim 47, wherein the fourth routine is executable to set a further unit penalty associated with the further penalty variable larger than the economic unit costs within the objective function.

49. The system of claim 47, wherein the fourth routine is executable to set a further unit penalty associated with the further penalty larger than the unit penalty associated with the penalty variable within the objective function.

50. The system of claim 47, wherein the fourth routine is executable to set a further unit penalty associated with the further penalty larger than the unit penalty associated with the penalty variable within the objective function.

51. The system of claim 37, wherein the third routine is an optimizer routine that is executable to develop a set of target values for a controller.

52. The system of claim 37, wherein the third routine is a controller routine.

53. The system of claim 37, wherein the third routine is a model predictive control type controller routine.

* * * * *

UNITED STATES PATENT AND TRADEMARK OFFICE
CERTIFICATE OF CORRECTION

PATENT NO. : 7,337,022 B2
APPLICATION NO. : 10/465153
DATED : February 26, 2008
INVENTOR(S) : Wilhelm K. Wojsznis et al.

It is certified that error appears in the above-identified patent and that said Letters Patent is hereby corrected as shown below:

On the Cover Page:

Item (74), "Marshall" should be -- Marshall, --.

At field (57), line 12, "bests" should be -- best --.

At Column 9, line 5, "predicted-steady" should be -- predicted steady --.

At Column 23, line 49, "Using-the" should be -- Using the --.

At Column 26, Equation 36, "$(S^{uT}\Gamma^T\Gamma S^u+\Gamma^{uT}\Gamma^u)$" should be -- $(S^{uT}\Gamma^T\Gamma S^u+\Gamma^{uT}\Gamma^u)^{-1}$ --.

At Column 27, line 63, "programming-paradigm" should be
-- programming paradigm --.

At Column 31, line 10, "typically; included-or" should be -- typically included or --.

At Column 32, line 9, "If" should be -- (If --.

At Column 34, line 57, "the;" should be -- the --.

At Column 34, line 58, "and-outputs" should be -- and outputs --.

UNITED STATES PATENT AND TRADEMARK OFFICE
CERTIFICATE OF CORRECTION

PATENT NO. : 7,337,022 B2
APPLICATION NO. : 10/465153
DATED : February 26, 2008
INVENTOR(S) : Wilhelm K. Wojsznis et al.

It is certified that error appears in the above-identified patent and that said Letters Patent is hereby corrected as shown below:

In the Claims:

At Column 40, line 31, "executable use" should be -- executable to use --.

Signed and Sealed this

Second Day of September, 2008

JON W. DUDAS
*Director of the United States Patent and Trademark Office*